United States Patent [19]

Kou

[11] Patent Number: 5,172,375
[45] Date of Patent: Dec. 15, 1992

[54] MULTIPLE ACCESS SATELLITE COMMUNICATION SYSTEM FOR MINI-EARTH STATION NETWORKS

[75] Inventor: Yukari Kou, Tokyo, Japan
[73] Assignee: NEC Corporation, Japan
[21] Appl. No.: 543,677
[22] Filed: Jun. 25, 1990

Related U.S. Application Data

[63] Continuation-in-part of Ser. No. 542,205, Jun. 22, 1990, abandoned.

[30] Foreign Application Priority Data

Jun. 22, 1989 [JP] Japan .................................. 1-158186

[51] Int. Cl.$^5$ .............................................. H04J 3/16
[52] U.S. Cl. .................... 370/95.3; 370/104.1
[58] Field of Search ................... 370/95.3, 94.1, 104.1, 370/95.1, 94.2

[56] References Cited

U.S. PATENT DOCUMENTS

| | | | |
|---|---|---|---|
| 3,806,879 | 4/1974 | Schmidt et al. | 370/104.1 |
| 4,381,562 | 4/1983 | Acampora | 370/97 |
| 4,731,783 | 3/1988 | Fontanes | 370/104.1 |
| 4,742,512 | 5/1988 | Akashi et al. | 370/95.3 |
| 4,775,974 | 10/1988 | Koboyoshi | 370/94.1 |

OTHER PUBLICATIONS

A. Fujii et al., *IEEE Global Telecommunications Conference*, "AA/TDMA—Adaptive Satellite Access Method for Mini-Earth Station Networks", vol. 3 of 3, pp. 1494–1499 (1986).

*Primary Examiner*—Douglas W. Olms
*Assistant Examiner*—T. Samuel
*Attorney, Agent, or Firm*—Ostrolenk, Faber, Gerb & Soffen

[57] ABSTRACT

A multiple access satellite communication system in which a plurality of mini-earth stations each transmit data packets to hub earth station via a satellite over an inbound channel, while the hub station transmits to the mini-earth stations in a broadcast mode over outbound channels. Each mini-earth station selectively uses a fixed assignement access method, random access method, and demand assignment access method, depending on the frequency of the transmission from a terminal connected thereto, the amount of transmitted data, and whether or not the transmission from the terminal is periodic. The hub station outputs a reception response signal to the outbound channels by determining whether or not a conflict of data packets or a transmission error has occurred on the inbound channels. Packets for re-transmission are sent out to the inbound channels by the demand assignment access method at all times, with no regard to the access method used at the time of transmission.

3 Claims, 18 Drawing Sheets

T1,T2: MINI EARTH STATION
A1,A2,P1,P2,: USER TERMINAL
H: HOST TERMINAL

RRP: RECEPTION RESPONSE FIELD
RA : RANDOM ACCESS SLOT ASSIGNMENT FIELD
RSA: RESERVED ACCESS SLOT ASSIGNMENT FIELD
FCS: FRAME CHECK SEQUENCE $a_1 \sim a_{15}$ : ACK/NAK

MULTIPLE ACCESS SATELLITE COMMUNICATION SYSTEM FOR MINI-EARTH STATION NETWORKS

This application is a continuation-in-part of application Ser. No. 07/542,205, filed Jun. 22, 1990 and now abandoned.

BACKGROUND OF THE INVENTION

The present invention relates to a multiple access satellite communication system in which a hub earth station and a plurality of mini-earth stations communicate over common shared channels via a satellite and, more particularly, to a mini-station-to-hub earth station access system.

In a POS (Point-of-Sales) system, banking/financial credit card verification or similar computer communication system, user terminals are connected to mini-earth stations to communicate with a host computer which is connected to a hub earth station. While each mini-earth station transmits information to only the hub station via a satellite over an inbound channel, the hub station sends a response to the information to all the mini-earth stations over an outbound channel. Each mini-earth stations selects only the information meant therefor out of the received signal and transfers it to the associated terminal. Specifically, information is interchanged only between the mini-earth stations and the hub station.

The individual mini-earth stations transmit information to the hub station using time slots which are the divisions of one frame time. The access of each mini-earth station to a time slot may be implemented by any one of three different methods known in the art, as follows.

A first method is a so-called fixed assignment access method which assigns exclusive time slots fixedly to the individual mini-earth stations. Every time a transmission request to the hub earth station occurs, each mini-earth station transfers a packet to the hub station by using the exclusive time slot assigned thereto. This kind of scheme is advantageously applicable when the terminals connected to the individual mini-earth stations output a transmission request constantly. However, when the transmission request occurs irregularly, the method is not desirable from the standpoint of efficient use of time slots.

Generally, satellite channels are lower in quality than wired communication channels and, therefore, bring about transmission errors. It has been customary, therefore, to cause a transmitting station to transmit a CRC (Cyclic Redundancy Check) code or similar error detection code together with data and cause a receiving station to constantly monitor the error detection code to see if packets have been transmitted without errors. On detecting an error in the data of a received packet, the hub station returns a Not Acknowledgement (NAK) signal indicative of a particular time slot associated with the packet with an error to all the mini-earth stations, urging the transmitted mini-earth station to re-transmit. In response to the NAK signal, the mini-earth station of interest re-transmits the data for which the NAK signal is meant by using the exclusive time slot thereof. Although the mini-earth station may have already received data following the data in question, the re-transmission data is sent out prior to the subsequent data. Stated another way, once the re-transmission of data occurs, the exclusive time slot of the mini-earth station is continuously occupied by the re-transmission data until the latter is out. Then, the subsequent data are accumulated in the mini-earth station with the result that the interval between the delivery of data from the terminal to the mini-earth station and the arrival of that data at the hub station is undesirably increased.

A random access method or slotted ALOHA method is a second method and allows a mini-earth station to transmit data by using any time slot every time the data is generated. The problem with this method is that packets sent from a plurality of mini-earth stations are apt to collide in the same time slot. In the event of collision, the hub station returns the NAK signal to all the mini-earth stations indicating that the packets in the time slot of interest were not received correctly. In response to the NAK signal, the mini-earth stations which transmitted the data in collision re-transmit them after the lapse of a period of time which is determined by using a random number, for example. So long as the frequency at which the individual mini-earth stations transmit packets is relatively low and packets are sent at random, this scheme substantially minimizes the need for re-transmission and thereby insures high throughput. Nevertheless, as the frequency of transmission from the individual mini-earth stations increases, the frequency of collision also increases to lower the throughput. When the transmission frequency from the mini-earth stations further increases, even the re-transmitted packets collide degrading throughput to a critical extent.

A demand assignment access method is a third method known in the art. A mini-earth station implemented with this method sends a request for the reservation of the number of slots to be used to a hub station every time a terminal associated with the mini-earth station produces a transmission request. On receiving the reservation request, the hub station assigns time slots which the mini-earth station that sent the request can use, i.e. reserved time slots. Reserved slot assignment information is returned to all the mini-earth stations. This approach is desirable when indidual mini-earth stations send a great amount of data needing a plurality of slots, to a hub station. Even when the transmission frequency from the mini-earth stations increases, this method eliminates the collision of packets particular to the slotted ALOHA method. However, each mini-earth station cannot transmit at all until it receives reserved slot assignment information from the hub station. The demand assignment access method, therefore, needs a longer interval between the transmission of data from a transmitting terminal to its associated mini-earth station and the arrival thereof at a receiving terminal than the fixed assignment access or slotted ALOHA method.

As discussed above, the fixed assignment access method, random access method and demand assignment access method each have advantages and disadvantages. Efforts have heretofore been made to combine these different methods in order to make the most of their advantages. For example, a combined random and demand access method is taught by Fujii et al in a paper entitled "AA/TDMA-ADAPTIVE SATELLITE ACCESS METHOD FOR MINI-EARTH STATION NETWORKS", IEEE Global Telecommunications Conference Record, pp. 42.4.1–42.4.6, December, 1986.

A mini-station implemented by the above-mentioned combined random and demand access method determines the lengths of data to be transmitted to a hub station and thereby classifies them as either short data and long data. Short data has a length smaller than a certain threshold value and can be transmitted in, for example, one time slot, while long data has a length greater than the threshold value and cannot be so transmitted. When long data is fed from the terminal to the mini-earth station, the mini-earth station sends a reservation request to the hub station for reserving the number of time slots which it needs to send the long data. Concerning short data, the mini-earth station sends it to the hub station by using a time slot which is not assigned to itself or any other mini-earth station as a reserved time slot, i.e. a random access slot.

The combined random and demand access method executes a unique re-transmission procedure when short data sent from a certain mini-earth station has collided with short data sent from another mini-earth station. Specifically, when a mini-earth station receives a NAK signal from a hub station after the transmission of data by the random access method, it determines that the satellite traffic is heavy and transmits short data left non-transmitted at the time of arrival of the NAK signal by the demand assignment access method together with long data. The mini-earth station sends re-transmission data by the demand assignment access method also. After an Acknowledgement (ACK) signal has returned from the hub station in reply to the re-transmission data transmitted by the demand assignment access method and all the short data sent before the arrival of the NAK signal, the mini-earth station again begins transmitting subsequent short data to the hub station by the random access method.

As stated above, when the supply of short data to the individual mini-stations increases, the combined random and demand access method inhibits random packet transmission so as to reduce the probability of collision. This, coupled with the fact that the delay ascribable to the second and successive transmissions of the same data is reduced, allows the combined method to be advantageously applied to a case wherein the amount of data to be sent from each mini-station fluctuates noticeably.

On the other hand, the terminals connectable to the mini-earth stations include terminals of the type generating data constantly. Data fed from this type of terminal to the associated mini-earth station should preferably be transmitted to the hub station by the fixed assignment access method, as stated earlier. The combined random and demand access method cannot meet this need. Especially, the combined method of Fujii et al. is not adequate when it is desired to send data from a terminal of the type generating data constantly to the hub station prior to data from the other terminals.

SUMMARY OF THE INVENTION

It is therefore an object of the present invention to provide a multiple access satellite communication system which can accomodate terminals different in the frequency of data generation and in the amount of data generation per transmission by combining the combined random and demand access method and the fixed assignment access method.

A multiple access satellite communication system of the present invention comprises a single hub earth station, and a plurality of mini-earth stations connected to the hub earth station by satellite channels. The mini-earth stations each transmit a data packet only to the hub earth station over an inbound channel by time division multiple access. The hub earth station transmits identical data to all the mini-earth stations over outbound channels. The mini-earth stations each accommodate a terminal which generates data to be transmitted in a slot of the inbound channel by a fixed assignment access method, and a terminal generates data to be transmitted in a slot of the inbound channel by a demand assignment access method or a random access method. The hub station comprises a receiving circuit for producing packet data by demodulating a signal on the inbound channel, generating an error detection signal packet data by packet data by detecting errors in the packet data, and extracting from the packet data free from errors received data and reservation slot request information which any of the mini-earth stations may transmit, a circuit for generating a frame timing signal for the outbound channel, a control circuit for producing reservation assignment information in response to the reservation slot request information and producing a reception response in response to the error detection signal, a circuit for multiplexing the reservation assignment information and the reception response with data fed from a host terminal which is connected to the hub earth station, and a circuit for transmitting the multiplexed data over the outbound channels after modulating the multiplexed data. The mini-earth stations each comprise a receiving circuit for demodulating a signal on the outbound channel to separate the frame timing signal for the outbound channel, the reservation assignment information, the reception response signal, and the data from the host terminal, a circuit for generating an in-station frame timing signal exclusive for the mini-earth station in response to the frame timing signal, a slot supervising circuit for outputting slot assignment information on the basis of the in-station frame timing signal and reservation assignment information, a first buffer for temporarily storing data to be transmitted by the demand assignment access method, a second buffer for temporarily storing data to be transmitted by the random access method, a third buffer for temporarily storing data to be transmitted by the fixed assignment access method, an access method detecting circuit for transferring, the data to the third buffer, when data inputted from any of the terminals connected to the mini-earth station is data to be transmitted by the fixed assignment access method, and for transferring other data to a message length detecting section. The message length detecting section is for detecting, when a re-transmission mode signal is OFF, a data length of the input data, transferring to the second buffer short data which can be transmitted in one time slot, dividing long data which cannot be transmitted in one slot into a plurality of data in portions, transferring a first one of the data portions to the second buffer, transferring the other data portions to the first buffer, and outputting a first request signal representative of a request for reservation of a necessary number of slots, and transferring, when the re-transmission mode signal is ON, all of the input data to the first buffer and outputting the first request signal with no regard to the data length. A data selecting circuit is for reading, when the re-transmission mode signal is OFF, data out of the first buffer when the slot assignment information is indicative of a demand assignment access slot, data out of the second buffer when the slot assignment information is indicative of a random access slot, and data out of the third buffer when the slot assignment information is indicative of a fixed assignment access slot, and, when the re-transmission mode signal is ON, reading data out of the first and second buffers when the slot assignment information is indicative of a demand assignment access slot and data out of the third buffer when the slot assignment information is indicative of a fixed assignment access slot. A re-transmission control circuit is for storing the data read by the data selecting circuit, discarding, when the reception response is positive (ACK), the data associated with the ACK response and transferring, when the reception response is negative (NAK), the data associated with the NAK response to the first buffer while outputting a second request signal representative of a request for reservation of a necessary number of slots, turning the re-transmission mode signal ON when a reception response in reply to a packet transmitted in the random access slot is negative, and turning the re-transmission signal OFF when a reception response to re-transmitted data is positive. A reservation request adding circuit is for producing the reservation slot request information in response to the first and second reservation requests and adding the reservation slot request information to an output of the data selecting means. A circuit sends an output of the reservation request adding circuit to the inbound channel.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
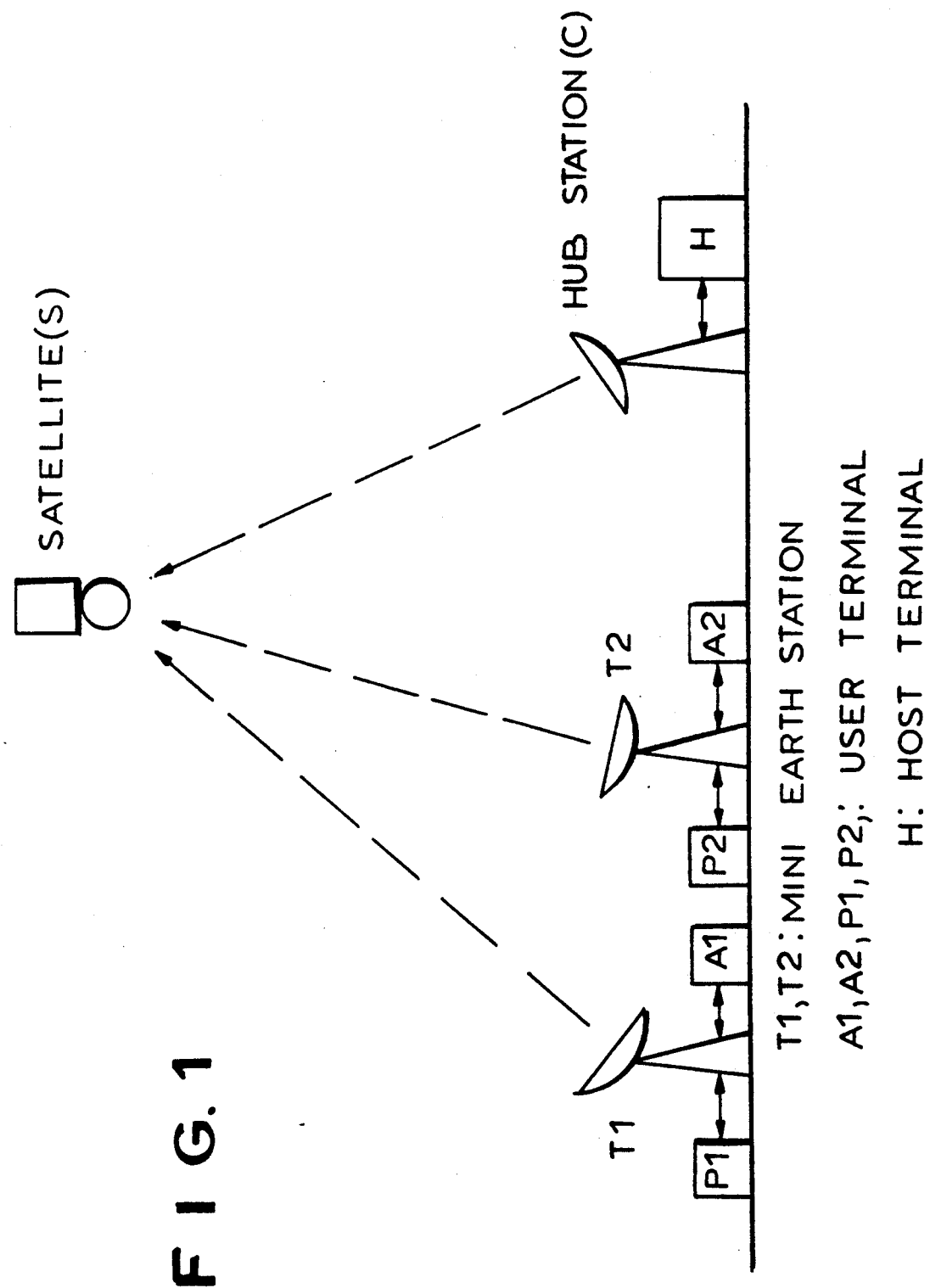
FIG. 1 shows a satellite communication network to which the present invention is applicable.

Referring to FIG. 1 of the drawings, a satellite communication network to which the present invention is applicable is shown and has a single hub station C, a plurality of mini-earth stations T1 and T2, and a satellite S. User terminals A1 and P1 are connected to the mini-earth station T1 while user terminals A2 and P2 are connected to the mini-earth station T2. The User terminals P1 and P2 access an inbound channel by the fixed assignment method and the user terminals A1 and A2 access the inbound channel by the combined random and demand access method. A host terminal H is connected to the hub station C and may comprise a computer or a packet switch, for example. The user terminals interchange data via the mini-earth stations, satellite, hub station, and host terminal.

The formats of packets which are transmitted over inbound and outbound channels will be described with reference to FIGS. 2, 3 and 4.

Figure 2:
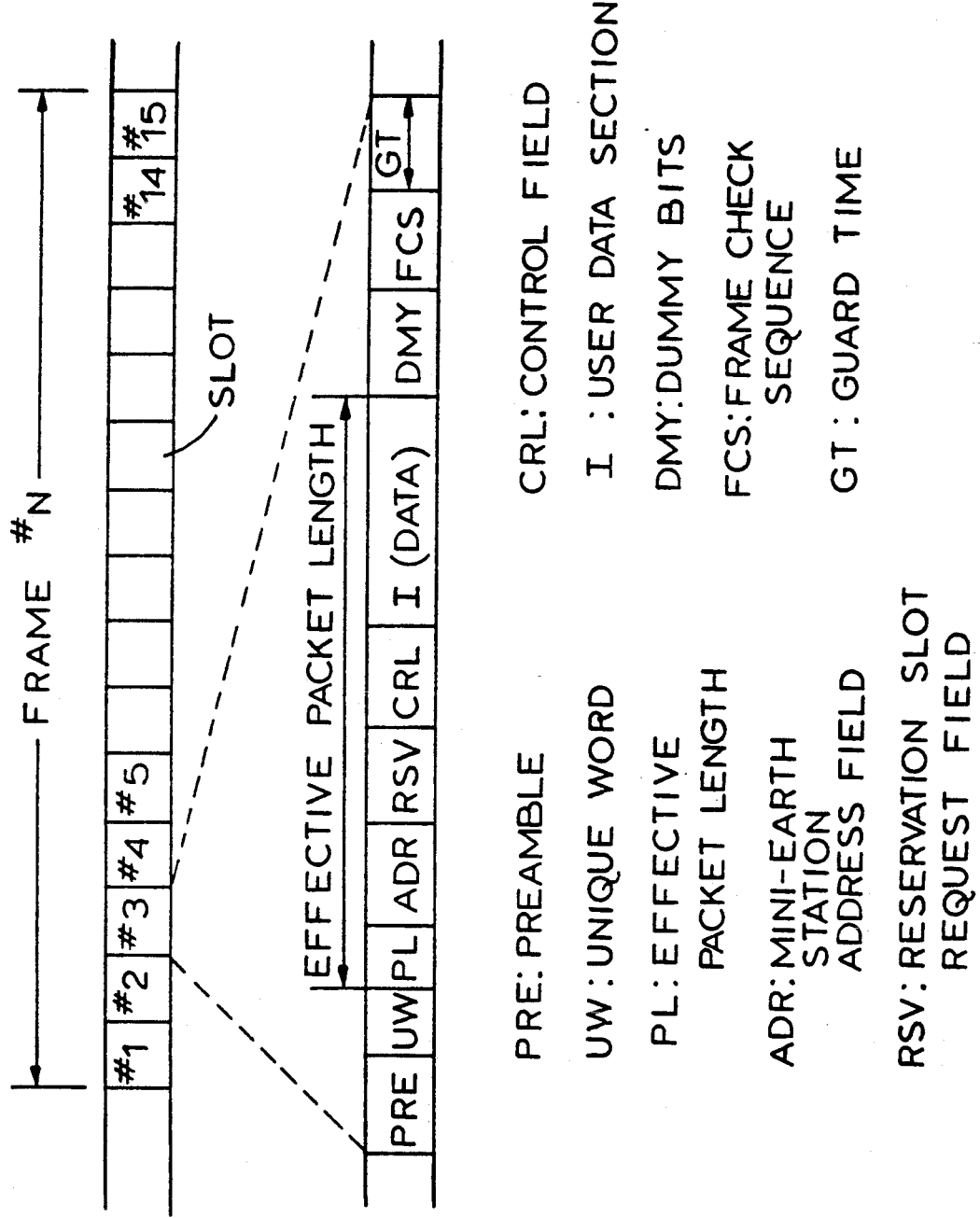
FIGS. 2 to 4 show formats of signals which are transmitted in the network of FIG. 1.

FIG. 2 shows the format of a packet which is sent from the mini-earth station to the hub station over an inbound channel. In the figure, one frame time is divided into fifteen time slots. Some of the time slots are fixedly assigned to the individual mini-earth stations, so that each mini-earth station may use the assigned time slot exclusively. The other time slots are selectively used for demand assignment access and random access as designated by the hub station frame by frame. The packet which each mini-earth station transmits in the associated time slot is made up of a preamble (PRE) for recovering a carrier and a clock, a unique word (UW) indicative of the beginning of a message, a field (PL) representative of an effective packet length, a field (ADR) showing the address of the transmitting mini-earth station, a field (RSV) indicative of the number of reservation slots requested by the transmitting mini-earth station which is represented by the field (ADR), a control field (CRL) describing a transmission/reception sequence number, a user data section (I) representative of data sent from the user terminal via the mini-earth station, a frame check sequence (FCS) for detecting transmission errors, and a guard time (GT) having a predetermined length for guaranteeing an interval between successive packets. The address of the mini-earth station, the address of the user terminal for which the packet is meant, and the address of the transmitting user terminal are included in the user data section (I). Each packet, inclusive of the guard time (GT), has to have the same length as the time slot. Hence, when the user data section (I) is short, dummy bits (DMY) are inserted in the packet.

Figure 3:
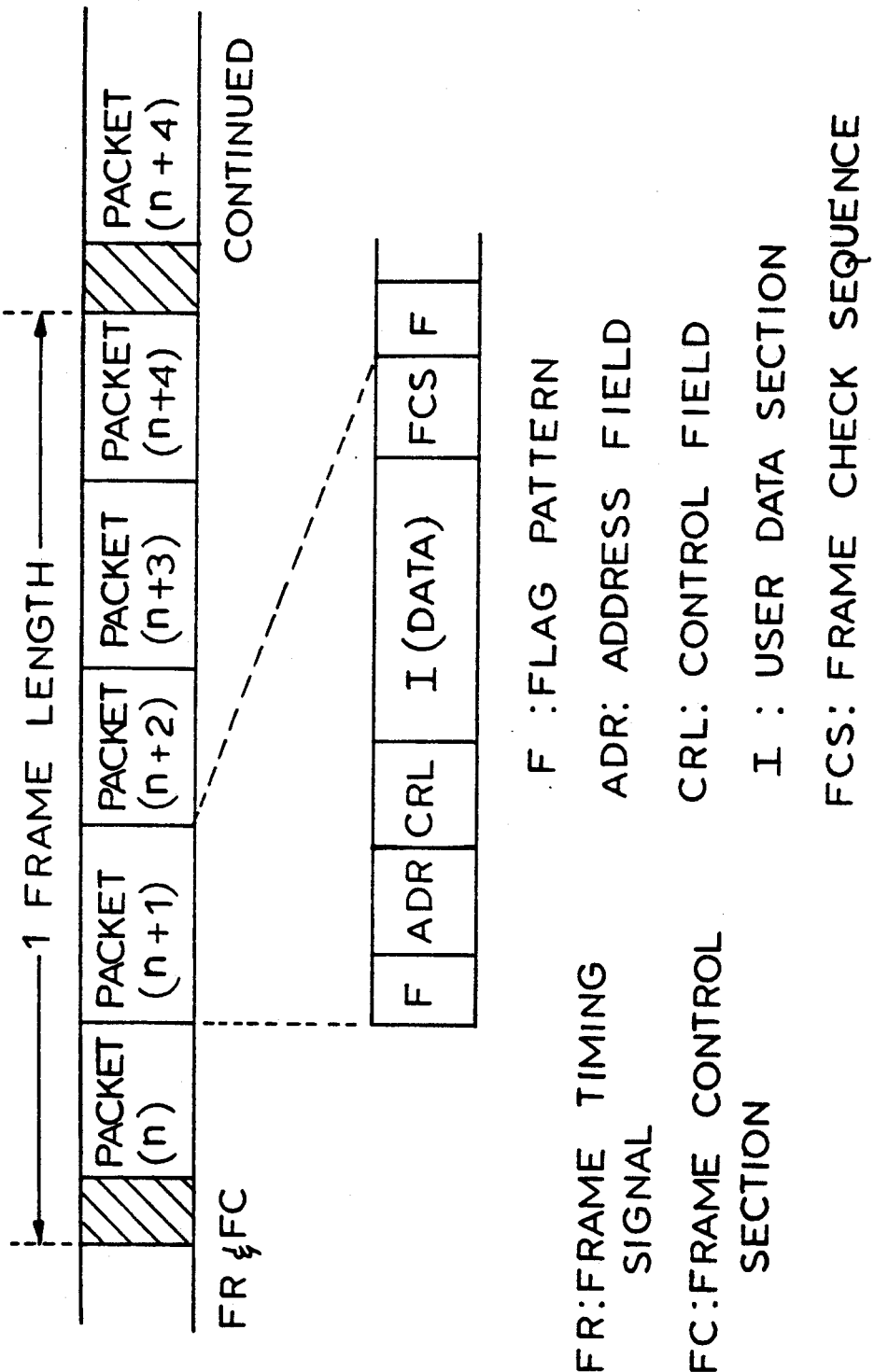

FIG. 3 shows the format of a signal which the hub station C sends to all the mini-earth stations over the outbound channel. As shown, the hub station C transmits a frame timing signal (FR) and a frame control section (FC) at predetermined intervals. The frame timing signal FR is constituted by a unique word which is distinguishable from the other signals. On receiving the frame timing signal, each mini-earth station establishes slot synchronization for transmitting packets to the hub station. As shown in FIG. 3, the packets to be sent from the hub station to the mini-earth stations are formatted according to HDLC (High-Level Data Link Control) procedures. Specifically, each packet has a flag sequence (F) indicative of the beginning of the packet and the end of the immediately preceding packet, an address field (ADR) representative of the destination mini-earth station address, a control field (CRL), a user data section (I), and a frame check sequence (FCS).

Figure 4:
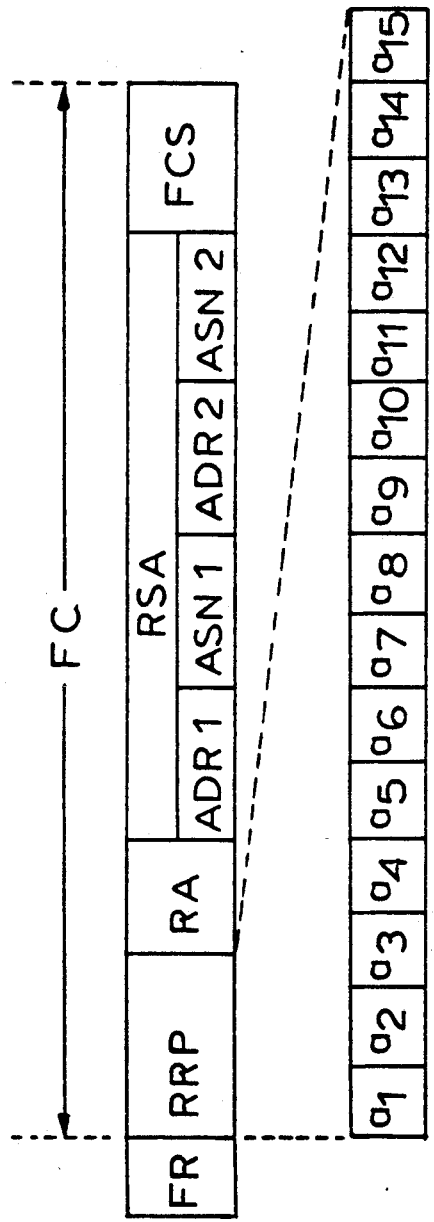

FIG. 4 shows the format of the frame control section (FC). The format includes a reception response field (RRP) in which the hub station sends the previously mentioned ACK/NAK signal to show the individual mini-earth stations whether or not it has received data in the reception slots without errors. In the figure, $a_1$ to $a_{15}$ are representative of ACK or NAK associated with the received signals in the slots 1 to 15, respectively. A random access slot assignment field (RA) designates a random access information slot. While each mini-earth station receives the frame control section (FC), it sends a packet in the next frame by using a slot which is designated by that field and on the random access basis. The frame control field (FC) has a reserved slot assignment field RSA. In FIG. 4, slots designated by ASN1 and ASN2 are assigned to the mini-earth stations having addresses (ADR1) and (ADR2), respectively. The frame control field (FC) further has a frame check sequence (FCS).

Figure 5:
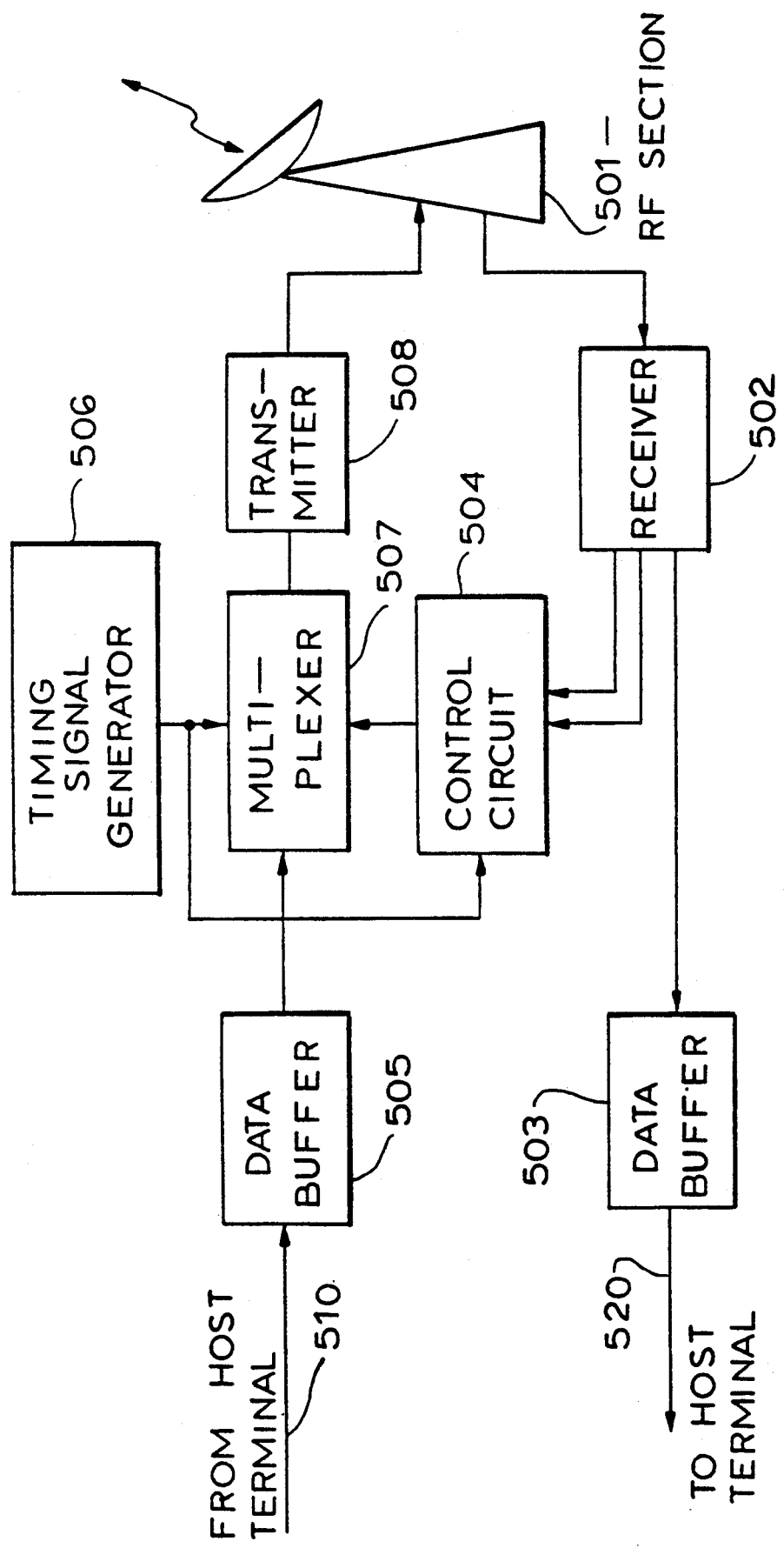
FIG. 5 is a block diagram schematically showing a specific construction of a hub station included in the network implemented by the present invention.

Referring to FIG. 5, a specific construction of the hub station for practicing the present invention is shown. In the following description, let the signal lines and the names of signals be identified with each other. As shown, an electromagnetic wave from the satellite is received by a high-frequency section or RF section 501 and transformed into an intermediate frequency (IF) band thereby. The IF signal is fed from the RF section 501 to a receiver 502 which then demodulates it to produce a baseband signal. Specifically, the receiver 502 extracts the effective packet length (PL) and successive data up to the frame check sequence (FCS), FIG. 2, from the received baseband signal by using the unique word as a reference. By using the frame check sequence (FCS), the receiver 502 determines whether or not data has been received without errors. If the received data is free from errors, the receiver 502 transfers (CRL) and (I), FIG. 2, to a data buffer 503. In response, the data buffer 503 converts the data having been inputted thereto at the timing particular to the hub station into data having a timing particular to the host terminal, and then transfers the data to the host terminal. If the received data has any error, the receiver 502 discards it. When the reservation slot request field (RSV), FIG. 2, includes a time slot reservation request, the receiver 502 feeds it to a control circuit 504 together with the address (ADR) of the requesting mini-earth station.

The control circuit 504 generates an ACK/NAK signal on the basis of the error detection information fed from the receiver 502 and then delivers the reception response field (RRP), FIG. 4, to a multiplexer 507. Further, by referencing the reservation request information fed from the receiver 502, the control circuit 504 produces information for assigning the requested number of slots to the mini-earth station of interest, i.e. the reserved slot assignment field (RSA), FIG. 4. In this instance, the slots fixedly assigned to the individual mini-earth stations are excluded. Those slots in which neither the fixed assignment nor the demand assignment were done are determined to be the slots for random access and correspond to the random access slot assignment field (RA), FIG. 4.

The host terminal feeds to the hub station the data sequence consisting of the address field (ADR), control field (CRL), and user data section (I), FIG. 3. The data is temporarily stored in a data buffer 505 of the hub station. The data lodged in the data buffer 505 is read out at the timing of the hub station and applied to the multiplexer 507.

A timing signal generator 506 generates a control signal for multiplexing the frame timing signal (FR), frame control signal (FC), and packet signal, FIGS. 3 and 4, every frame period. The control signal is fed to the multiplexer 50. Further, the timing signal generator 506 supplies the frame timing of the hub station to the control circuit 504.

The multiplexer 507 multiplexes the outputs of the control circuit 504, data buffer 505, and timing signal generator 506 and feeds the resultant signal to a transmitter 508 together with the frame check sequence (FCS).

The transmitter 508 modulates the signal fed thereto from the multiplexer 507 and transfers the modulated signal to the RF section 501. Then, the RF section converts the input signal into the high-frequency and transmits the high-frequency signal to the satellite.

Figure 6:
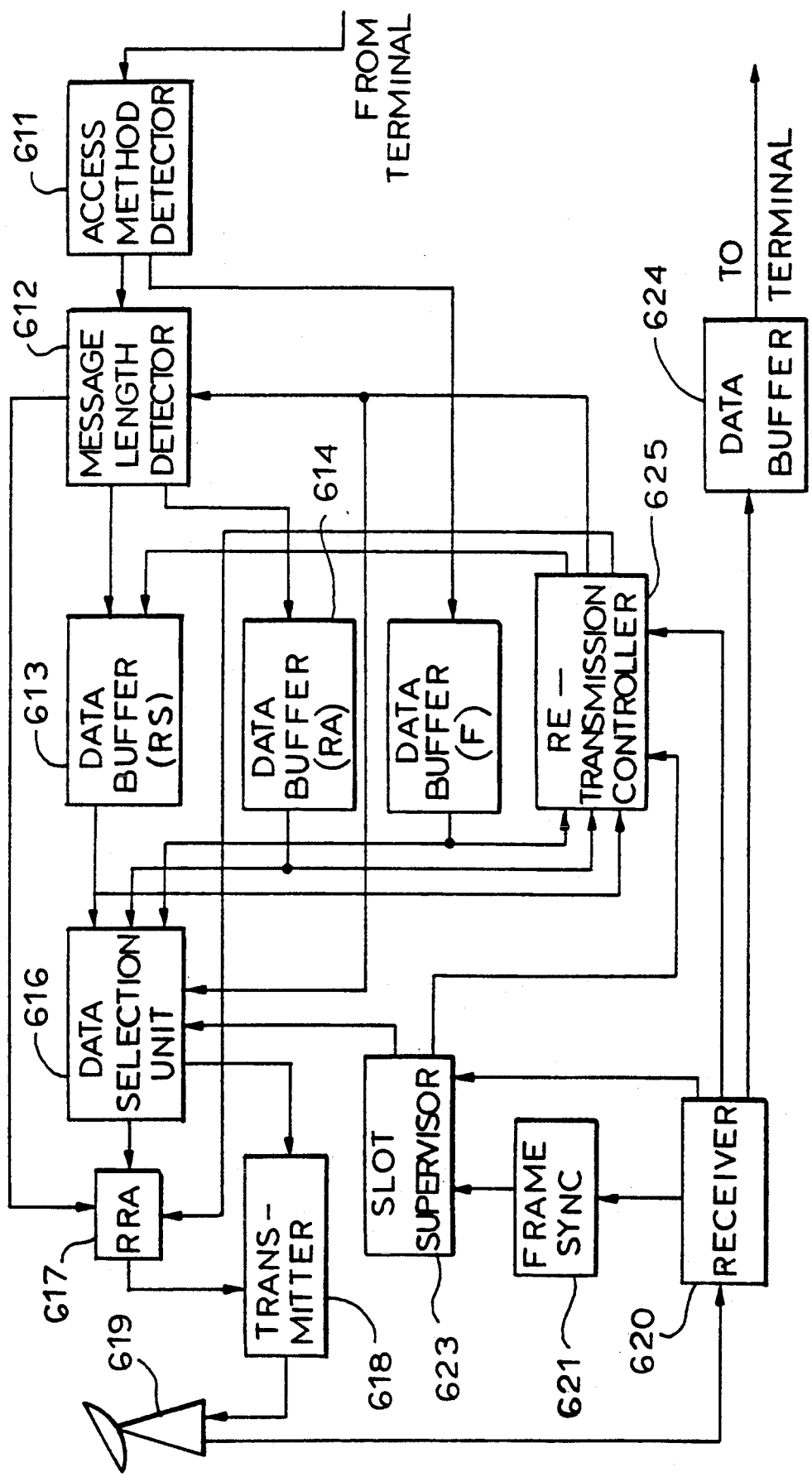
FIG. 6 is a block diagram schematically showing a specific construction of a mini-earth station of the network implemented by the present invention.

Referring to FIG. 6, a specific construction of the mini-earth station with which the present invention is practicable will be described. In the figure, although a plurality of different kinds of signals may be interchanged between associated blocks, they are represented by a single signal line for clarity purposes. A user terminal connected to the mini-earth station feeds to the latter a data sequence which includes the control field (CRL) and user data section (I), FIG. 2. This data sequence is applied to an access method detector 611. The user terminal has added a flag to the data to show whether the data should be transmitted by fixed assignment access or by combined random and demand access. By referencing the flag, the access method detector 611 transfers the data intended for fixed assignment access to a data buffer (F) 615 and the data intended for combined access to a message length detector 612. The access method detector 611 adds PL, ADD, RSV and DMY, FIG. 2, to the data to be transferred to the data buffer (F) 615.

The message length detector 612 determines the length of the data fed thereto from the access method detector 611 and, if the data is short, transfers it to a data buffer (RA) 614. On receiving the short data, the data buffer (RA) 614 delivers to a data selection unit 616 a signal indicative of how many slots of data the data buffer (RA) 614 currently hold. If the data is long, the message length detector 612 divides it on the basis of a unit which can be accommodated in one time slot, and transfers the first slot of data to the data buffer (RA) 614 and the remaining data to a data buffer (RS) 613. The message length detector 612 calculates the number of slots necessary for the data transferred to the data buffer (RS) 613 to be transmitted and informs a reservation request adding section (RRA) 617 of the result of calculation. Further, the message length detector 612 adds the effective packet length (PL), mini-earth station address (ADR), reservation slot request field (RSV), and dummy bits (DMY) to the data to be transferred to the data bufrer (RA) 614 and data buffer (RS) 613. The operation of the message length detector 612 described so far is performed when no transmission errors or no collisions of data have occurred on the satellite channel, i.e., when the hub station has returned only the signal ACK in reply to a packet transmitted thereto from a mini-earth station. On the other hand, assume that a re-transmission controller 625 which will be described delivers to the message length detector 612 a control signal indicating that the mini-earth station is re-transmitting data which it transmitted in a random access slot (hereinafter referred to as "random access re-transmission mode"). Then, the message length detector 612 transfers all the data, whether they be short or long, to the data buffer (RS) 613, and it informs the reservation request adding section 617 of the number of necessary slots, i.e., "1" even for short data.

A slot supervisor 623 feeds slot assignment information and a slot timing signal to the data selection unit 616. In response, the data selection unit 616 reads the data out of the data buffer (RS) 613, data buffer (RA) 614 and data buffer (F) 615 and applies them to the RRA 617. The data transferred to the data selection unit 616 is also transferred to the re-transmission controller 625. When the slot is of the kind which the station cannot use for transmission or when the data buffers are empty, the data selection controller 616 instructs the transmitter 618 to stop transmission. While the signal representative of the random access re-transmission mode is fed from the re-transmission controller 625 to the data selection unit 616, the unit 616 reads the data out of the data buffer (RS) 613 or data buffer (RA) 614 at the time when the data adapted for reservation slots should be read out. In this manner, when a collision has occurred on the satellite channel, not only long data but also short data are transferred to the hub station by the demand assignment access method.

The reservation request adding section (RRA) 617 sums the numbers of requested slots fed thereto from the message length detector 612 and re-transmission controller 625, generates the reservation slot request field (RSV), FIG. 2, and then delivers it to the transmitter 618 by adding it to the data which is fed from the data selection unit 616.

In response to the output of the reservation request adding section 617, the transmitter 618 generates the unique word UW and successive data up to the frame check sequence FCS, FIG. 2, modulates the resultant signal, and then delivers the modulated signal to the satellite channel via the RF section 619.

How the mini-earth station responds to data transmitted from the hub station via the satellite, i.e. the data shown in FIGS. 3 and 4 will be described hereinafter.

The electromagnetic wave from the satellite is received and converted into an IF band by the RF section 619 and then fed to a receiver 620.

The receiver 620 demodulates the input IF signal, separates the frame timing signal (FR), FIG. 3, and then applies it to a frame synchronizing section (FRAME SYNC) 621. Also, the receiver 620 separates the frame control signal, FIG. 4, on the basis of the frame timing signal. The reception response field (RRP) is fed to the re-transmission controller 625, while the random access slot assignment field (RA) and reserved slot assignment field (RSA) to the slot supervisor 623. Packet data made up of the control field (CRL) and user data section (I), FIG. 3, is stored in a data buffer 624 and is read out at the timing particular to the user terminal connected to the mini-earth station of interest.

The frame synchronizing section 621 generates a frame timing signal of the own station in response to the frame timing signal and feeds it to the slot supervisor 623. In response, the slot supervisor 623 generates a slot timing and delivers the stored slot assignment information to the data selection unit 616. The slot assignment field (RA) and reserved slot assignment field (RSA) fed from the receiver 620 are stored in the slot supervisor 623 to be used as slot assignment information for the next frame.

The re-transmission controller 625 decodes the input reception response field (RRP), separates ACK/NAK slot by slot, and discards the data adapted for re-transmission and associated with the slot in which the ACK signal has been received. The re-transmission controller 625 transfers the data adapted for re-transmission and associated with the slot in which the NAK signal has been received to the data buffer (RS) 613, while instructing the reservation of another time slot to RRA 617.

When the re-transmission controller 625 receives the NAK signal in reply to data transmitted in a slot for random access, it delivers a mode signal indicative of the previously mentioned random access re-transmission mode to the message length detector 612 and data selection unit 616. This mode will be cancelled as soon as the ACK signal is received in reply to the re-transmitted data.

The constructions and operations of the receiver 502 and control circuit 504 included in the hub station C will be described with reference to FIGS. 7, 8 and 9 specifically.

Figure 7:
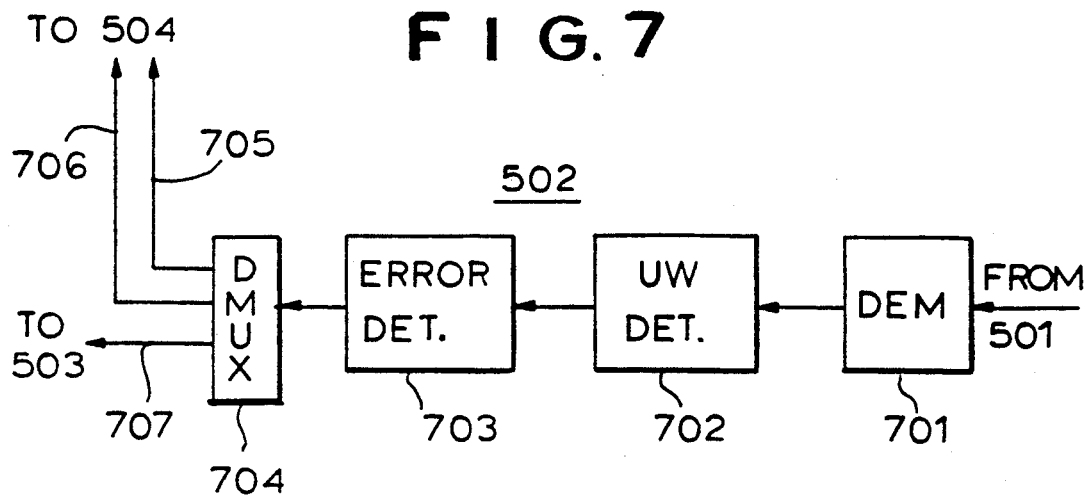
FIG. 7 is a block diagram schematically showing a specific construction of a receiver installed in a hub station.

The receiver 502 is shown in FIG. 7 and includes a demodulator 701. The demodulator 701 demodulates a received signal fed thereto from the RF section 501 and delivers the demodulated signal to a unique word detector 702. In response, the unique word detector 702 detects a unique word (UW), FIG. 2, out of the demodulated signal and feeds packet data following the unique word, i.e., effective packet length (PL) and successive data up to frame check sequence (FCS), FIG. 2, to an error detector 702. The error detector 703 checks the packet data for errors by using the frame check sequence (FCS). Packet data free from errors are applied to a demultiplexer 704, while packet data with errors are discarded and fed to the demultiplexer 704 as a sequence of zeros. The address (ADR) of the transmitting mini-earth station and the reservation slot request field (RSV) are delivered to the control circuit 504, FIG. 5, over signal lines 705 and 706. The control field (CRL) and user data section (I) are fed to the data buffer 503, FIG. 5.

Figure 8:
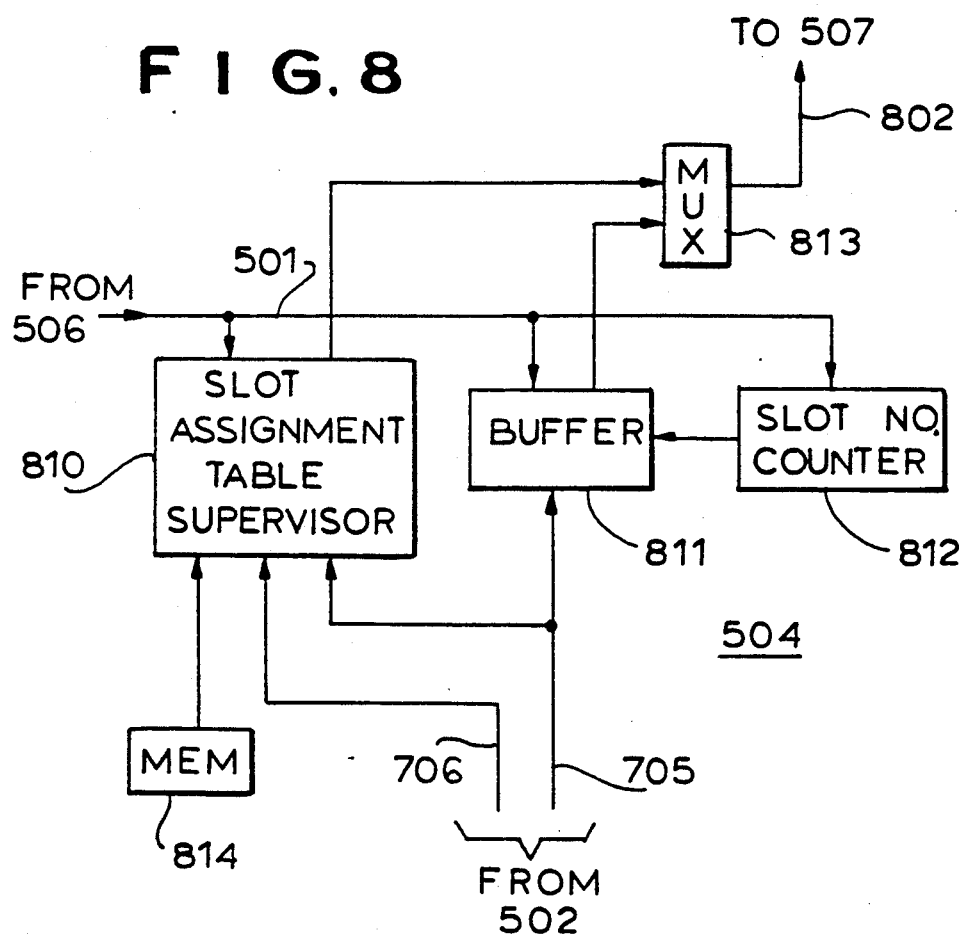
FIG. 8 is a block diagram schematically showing a control circuit also included in the hub station.

The control circuit 504 is shown in FIG. 8 and includes a slot assignment table supervisor 810. The receiver 502, FIG. 5, applies the address field (AD) 705, reservation slot request field (RSV) 706, and fixed assignment slot information which has been stored in a memory 814 to the slot assignment table supervisor 810. In response, the supervisor 810 prepares a table for supervising the assignment of reserved slots to the individual mini-earth stations. This table is read out in response to the frame timing signal which is fed from the timing signal generator, FIG. 5, over a signal line 801, and then it is applied to the multiplexer 813 as the reserved slot assignment field (RSA). However, concerning the mini-earth station indicated by the address field (ADR) which was included in the data packet discarded by the error detector 703, the address field is fed in the form of all zero data and, hence, no reserved time slots are assigned. Further, reservation assignment is not effected with the slots which are fixedly assigned to the individual mini-earth stations.

The address field (ADR) 705 is also fed to a buffer 811 and sequentially stored therein in order of input. A slot number counter 812 generates a write pointer associated with the reception response field (RRP), FIG. 4, in response to the frame timing signal fed from the timing signal generator 506, FIG. 5. Based on this write pointer, the address field (ADR) 705 is written to the buffer 811 as mentioned above. The buffer 811 generates a clock in response to the frame timing signal 801 and only at the timing of the reception response field (RRP), FIG. 4, and reads out the content thereof by the clock signal. The data so read out of the buffer 811 is applied to a multiplexer 813. The multiplexer 813 multiplexes the outputs of the slot assignment table supervisor 810 and buffer 811 as shown in FIG. 4. The multiplexed output of the multiplexer 813 is transferred to the multiplexer 507, FIG. 5, over a signal line 802 together with the frame check sequence (FCS), FIG. 4.

Figure 9A:
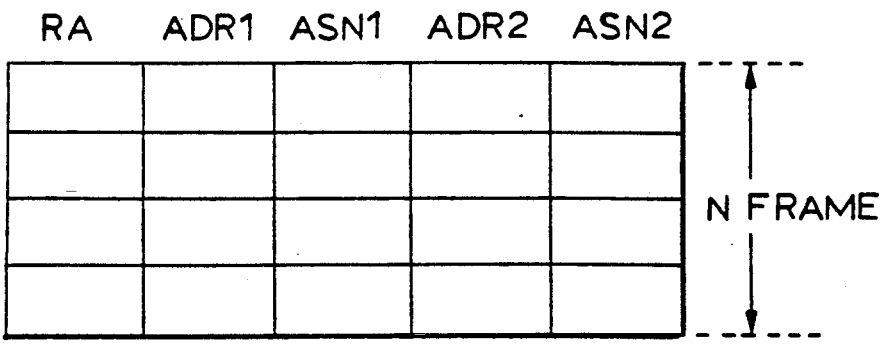
FIGS. 9A to 9C indicate the function of a slot assignment table supervisor built in the hub station.
Figure 9B:
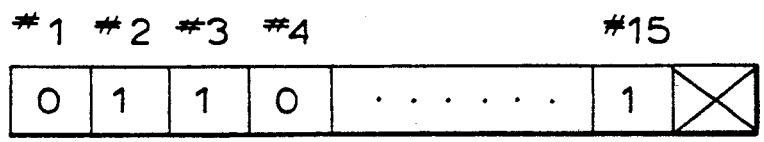
Figure 9C:
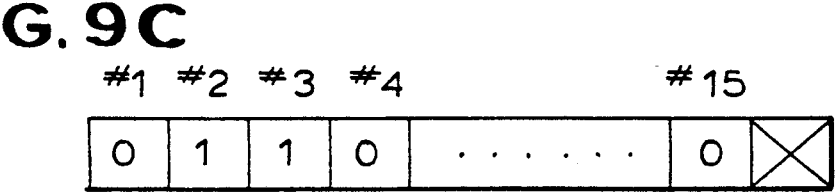

A reference will be made to FIGS. 9A and 9B for describing the operation of the slot assignment table supervisor 810 of the hub station C. FIG. 9A shows a specific slot assignment table generated and supervised by the slot assignment table supervisor 810. In the specific table, five items, i.e., random access slot information (RA), mini-earth stations' addresses (ADR1) and (ADR2) to which reserved slots are assigned, and reserved slot assignment information ASN1 and ASN2 are supervised. FIGS. 9B and 9C show respectively specific formats of the random access slot information and reserved slot assignment information. In FIGS. 9B and 9C, one frame is divided into fifteen slots. In the random access slot information (RA) and reserved slot assignment information (ASN) and (ASN2), each bit is representative of information associated with respective one of the slots. Concerning the random access slot information (RA), the bits associated with the slots which are assigned to any of the mini-earth stations either by demand assignment or by fixed assignment are set to "1". Stated another way, in the information (RA), the slots represented by "0" bits are the slots which allow random access. In the reserved slot assignment information (ASN1), the bits associated with the slots to be demand-assigned to the stations which neighbor the address (ADD1) are set to "1". This is also true with the other reserved slot assignment information ASN2. The slot assignment table supervisor 801 prepares the slot assignment table on the basis of the number of requested reservation slots (ASN1, ASN2) fed from the receiver 502, the address (ADR1, ADR2) of the mini-earth station sent the request, and the fixed assignment information fed from the memory 814. The memory 814 stores N frames of information, i.e., the illustrative embodiment is capable of determining the fixed assignment slots every N frames. Every time the write pointer of the slot assignment table is updated, the supervisor 810 reads one frame of information out of the memory 814 and, for the slots which are fixedly assigned, sets the associated bits of the random access slot assignment field (RA) to "1" beforehand.

When the mini-earth station's address and the number of requested reservation slots are fed to the slot assignment table supervisor 810 over the signal lines 705 and 706, the supervisor 810 references a particular frame pointed by the write pointer of the slot assignment table. If not addresses have been written to the mini-earth stations' address (ADR1) or (ADR2), the supervisor 810 references the random access slot information (RA). If any one of the bits of the information (RA) has not been set to "1", the supervisor 810 determines that the slot associated with that bit should be reserved. Then, the supervisor 810 sets the associated bit of the reserved slot assignment data (ASN1) or (ASN2) to "1" and writes the address of the mini-earth station requesting the reservation to the address field (DR1) or (ADR2). As soon as all the bits of the random access slot assignment field (RA) are set to "1" or when two mini-earth stations to which reserved slots should be assigned in the frame of interest are determined, the write pointer of the slot assignment table is updated to allow reserved slots to be assigned in the next frame. By the sequence of steps described above, the random access slot assignment field (RA) and reserved slot assignment field (RA) are produced.

Referring to FIGS. 10 to 17, there will be described the constructions and operations of the message length detector 612, data buffer (RS) 613, data selection unit 616, reservation request adding section 617, receiver 620, slot supervisor 623, and re-transmission controller 625 which form a part of the mini-earth station C.

Figure 10:
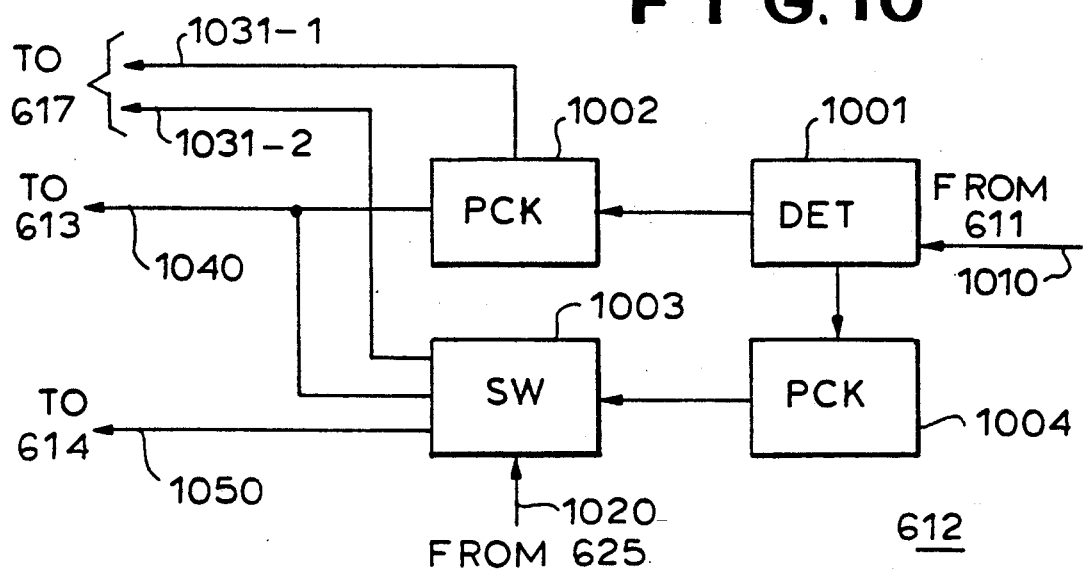
FIG. 10 is a block diagram schematically showing a specific construction of a message length detector installed in a mini-earth station.

FIG. 10 shows a specific construction of the message length detector 612. As shown, data outputted by the access method detector 611, FIG. 6, is applied to a detector 1001 over a signal line 1010. The detector 1001 detects the length of the input data to see if it is short enough to be accommodated in one time slot. If the data is longer than one time slot, the detector 1001 separates only the leading data and successive data which can be accommodated in one time slot from the others and delivers them to a packetizing circuit 1004, while delivering the other data to a packetizing section 1002.

In response, the packetizing circuit 1004 formats the effective packet length (PL) and successive data up to the dummy bit (DMY), FIG. 2, and feeds it to a switching circuit 1003.

On receiving the long data except for the one slot of data, the packetizing circuit 1002 subdivides it into a plurality of data each being sized short enough to be accommodated in one time slot. Then, the packetizing circuit 1002 produces data in the form the effective packet length (PL) to the dummy bit (DMY), FIG. 2, with each of the subdivided data, feeding the resultant data to the data buffer (RS) 613, FIG. 6, over a signal line 1040 together with a write enable signal, not shown. At the same time, the circuit 1002 delivers the number of subdivided data, or the necessary number of time slots, to the reservation request adding section 617, FIG. 6, over a signal line 1031-1.

The switching circuit 1003 passes the output of the packetizing circuit 1004 to a signal line 1040 together with a write enable signal, not shown, when a signal representative of the random access re-transmission mode is applied thereto from the re-transmission controller 625, FIG. 6, over a signal line 1020, the signal line 1040 terminates at the data bufrer (RS) 613, FIG. 6. At the same time, the switching circuit 1003 causes the reservation request adding section 617, FIG. 6, to request the hub station C the reservation of one addition time slot over a signal line 1031-2.

Figure 11:
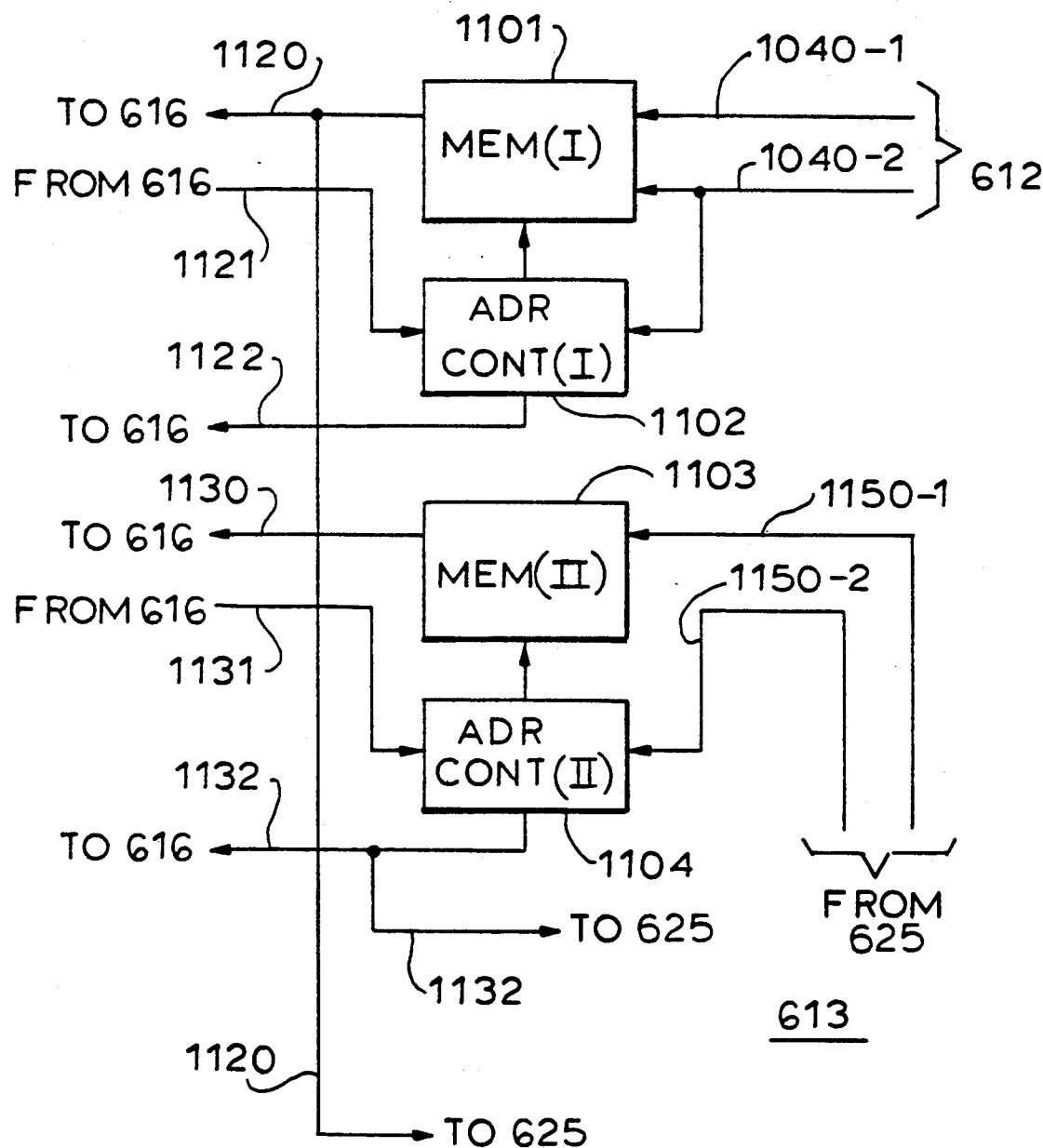
FIG. 11 is a block diagram schematically showing a specific construction of a data buffer built in the mini-earth station.

FIG. 11 shows the data buffer (RS) 613 specifically. As shown, a memory (I) 1101 stores the data fed from the message length detector 612 over the signal line 1040-1. An address control circuit (I) 1102 feeds a write address to the memory (I) 1101 in response to the write enable signal which is applied thereto from the message length detector 612 over the signal line 1040-2. On receiving the read enable signal 1121 from the data selection unit 616, the address control circuit (I) 1102 generates a read address and feeds it to the memory (I) 1101. In this manner, the data from the message length detector 612, FIG. 6, is transferred to the data selection unit 616 and re-transmission controller 625 over a signal line 1120 in the first-in first-out mode. The address controller (I) 1102 monitors the difference between the number of times that the write enable signal has been inputted and the number of times that the read enable signal has been inputted, thereby calculating the number of packets stored in the memory (I) 1101. The calculated number of packets is sent to the data selection unit 606, FIG. 6, over a signal line 1122.

The block constituted by a memory (II) 1103 and an address control circuit (II) 1104 is constructed and operated in the same manner as the block made up of the memory (I) 1101 and address control circuit (I) 1102. Specifically, the memory (II) 1103 and address control circuit (II) 1104 handle re-transmission data fed from the re-transmission controller 625 and delivers the number of stored packets to a signal line 1132 while outputting data to a signal line 1130 in response to a read enable signal 1131. The number of packets in the memory (II) 1103 is sent to the data selection unit 616 and the re-transmission controller 625, FIG. 6, over a signal line 1132. The signal lines 1120 and 1130 are connected to each other, so that data read out of the data buffer (RS) 613 are delivered to the re-transmission controller 625.

The data buffer (RA) 614 and data buffer (F) 613 shown in FIG. 6 is also constructed as shown in FIG. 11 except for the omission of the memory (II) 1103 and address control circuit (II) 1104.

A reference will be made to FIG. 12 for describing the construction and operation of the data selection unit 616 and reservation request adding section 617, FIG. 6. The data selection unit 616 has a switch 1301 and a control circuit 1302. The control circuit 1302 receives slot assignment information and the slot timing signal from the slot supervisor 623, FIG. 6, over signal lines 1360-1 and 1360-2, a signal representative of the random access re-transmission mode from the re-transmission controller 625 over the line 1020, and the numbers of packets currently stored in the memory (I) 1101 and memory (II) 1103, FIG. 11, and data buffer (RA) 614 and data bufrer (F) 615 over signal lines 1122, 1132, 1312 and 1322. In response to these signals, the control circuit 1302 selectively outputs a read enable signal to one of signal lines 1121, 1131, 1311 and 1321. The read enable signals 1121 and 1131 are input to an OR circuit, and the output of the OR circuit is fed to the re-transmission controller over a signal line 1210. The read enable signals 1311 and 1321 are also fed to the re-transmission controller 625. The packet data read out of the memory (I) 1101, the packet data read out of the memory (II) 1103, the packet data read out of the data buffer (RA) 614, and the packet data read out of the data buffer (F) 615 are routed to the switch 1301 over signal lines 1120, 1130, 1310, and 1320, respectively. The control circuit 1302 causes the switch 1304 to select the data packet outputted by one of the memories to which the read enable signal was applied.

When the slot assignment information inputted to the control circuit 1302 over the signal line 1360-1 is representative of a slot fixedly assigned to another mini-earth station, the control circuit 1302 does not output the read enable signal and, instead, feeds a transmission stop command signal 1350 to the transmitter shown in FIG. 6. When no data to transmit exist despite that the slot represented by such information is the slot in which the own station can transmit, the control circuit 1302 also feeds the transmission stop command signal 1350. For example, when a signal showing that the data buffer (RA) 614 is empty arrives over the signal line 1312 in reply to the slot assignment information, the control circuit 1302 outputs the transmission stop command signal 1350 in place of the read enable signal 1131.

The data selection unit 616 is operated as outlined above. The control circuit 1302 of the data selection unit 616 is implemented as a microprocessor loaded with a program which will be described in detail later.

Figure 12:
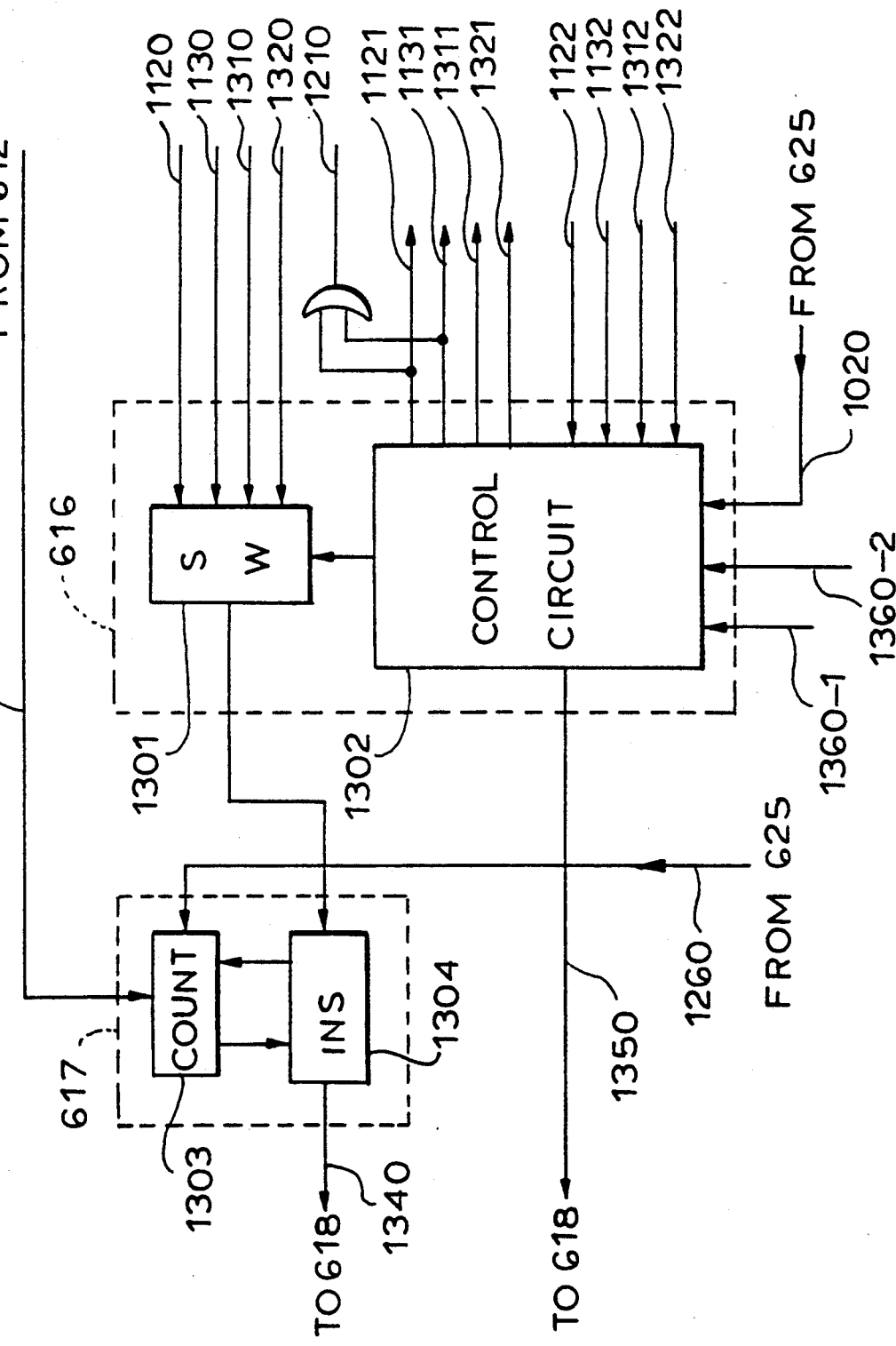
FIG. 12 is a block diagram schematically showing a specific construction of a data selection unit and a reservation request adding section included in the mini-earth station.

As also shown in FIG. 12, the reservation request adding section 617 has a counter 1303 for supervising the number of reservation slots to be requested, and an inserting circuit 1304 for writing the number of requested slots to the reservation slot request field (RSV) which is fed thereto from the switch 1301. While the reservation slot request field (RSV) is provided by the message length detector 612 or the access method detector 611 as stated earlier, the number of slots to be reserved is written by the inserting circuit 1304. The data packet to which the inserting circuit 1304 has written the number of requested slots is applied to the transmitter 618 over a signal line 1340. The reservation request is fed to the reservation request adding section 617 from the message length detector 612 and re-transmission controller 625, FIG. 6, over the signal lines 1031 and 1260, as stated previously. Such reservation requests are applied to and up-counted by the counter 1303. The inserting circuit 1304 writes the value of the counter 1303 to the reservation slot request field (RSV) of the packet data fed from the switch 1301, while decrementing the counter 1303 by the value written to the field (RSV).

Figure 13A:
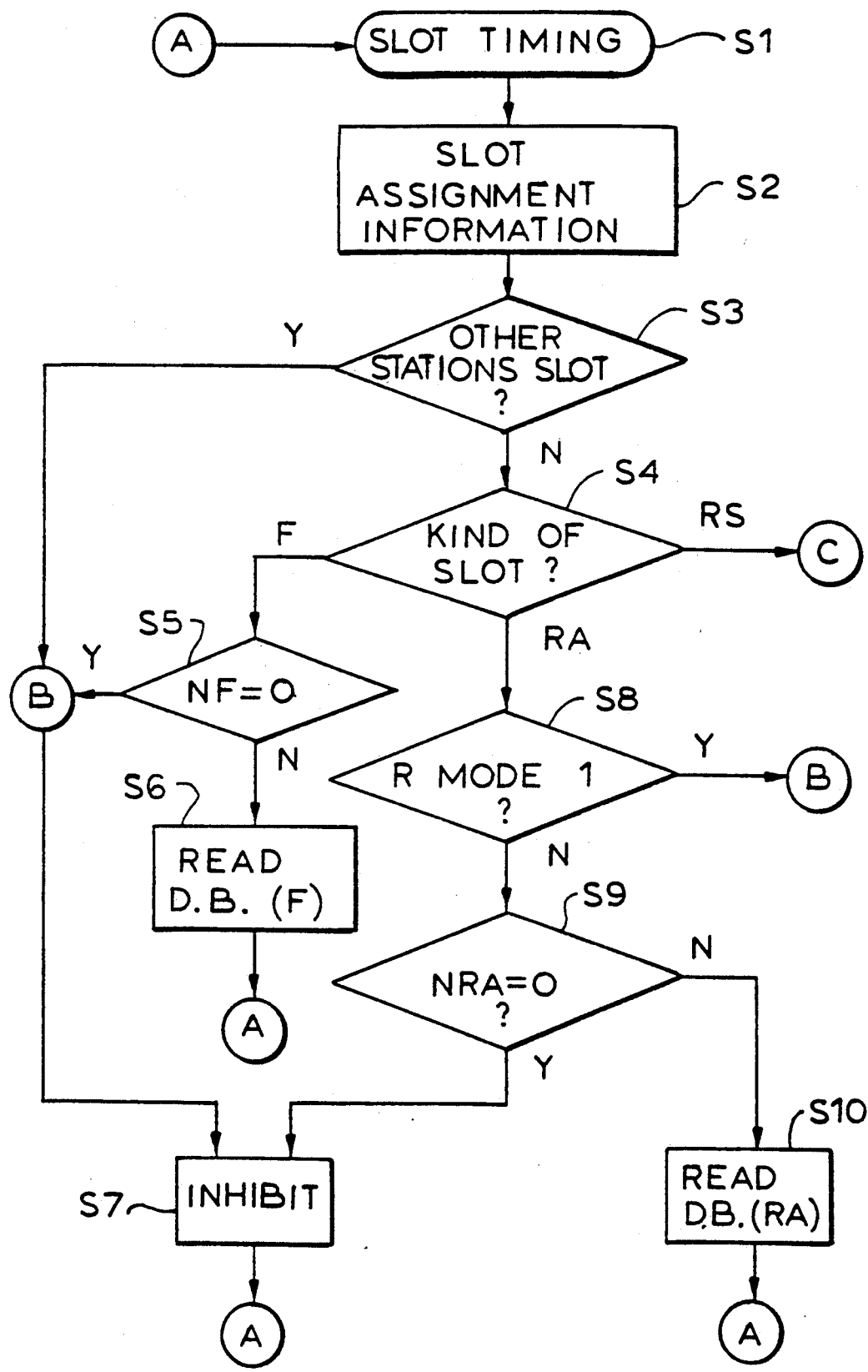
FIGS. 13A and 13B are flowcharts demonstrating specific operations of a control circuit in the data selection unit.

The program loaded in the microprocessor with constitutes the control circuit 1302 shown in FIG. 12 will be described with reference to FIGS. 13A and 13B.

When a slot timing signal is fed from the slot supervisor 623 to the control circuit (step S1), the control circuit reads slot assignment information (step S2) and then determines whether or not the slot is a slot assigned to another mini-earth station (i.e. a fixedly assigned slot or a reserved slot) (step S3). If the answer of the step S3 is YES, the operation is transferred to a step S7 for outputting a transmission inhibition signal. If otherwise, a step S4 is executed for determining the kind of the slot on the basis of the slot assignment information. If the slot of interest is a fixedly assigned slot, a random access slot or a reserved slot, the program advances to a step S5, S8 or S11.

In the step S5, whether or not the number of data packets (NF) stored in the data buffer (F) 615 by fixed assignment and which are to be transmitted is zero. If the answer of the step S5 is YES, the step S7 is executed for outputting a transmission inhibition signal and the program awaits until the next slot timing signal arrives. If the answer of the step S5 is NO, the control circuit delivers a read enable signal to the data buffer (F) 615 and causes the switch 1301 to read the data packet which will be read out of the data buffer (F) 615. Thereafter, the control circuit waits for the arrival of the next slot timing signal.

If the slot of interest is a random access slot as determined in the step S4, the control circuit executes a step S8 for determining whether or not a variable RMODE is "1" by referencing the re-transmission controller 625. The variable RMODE shows whether or not the current mode is the random access re-transmission mode, and it is "1" if so. If the variable RMODE is "0", meaning that the current mode is not the random access mode, a step S9 is executed. If the answer of the step S8 is YES, the operation is transferred to the step S7 for outputting a transmission inhibition signal and the program awaits the arrival of the next slot timing.

In the step S9, the control circuit determines whether or not the number of stored packets (NRA) fed from the data buffer. (RA) 614 which is assigned to packets for random access is zero. If the answer of the step S9 is YES, meaning that the data buffer (RA) 614 is empty, the operation is also transferred to the step S7 for producing a transmission inhibition signal. If the answer of the step S9 is NO, a step S10 is executed for delivering a read enable signal to the data buffer (RA) 614 and causing the switch 616 to select a data packet which will be read out of the buffer (RA) 614. Thereafter, the control circuit reaches the waiting state.

Figure 13B:
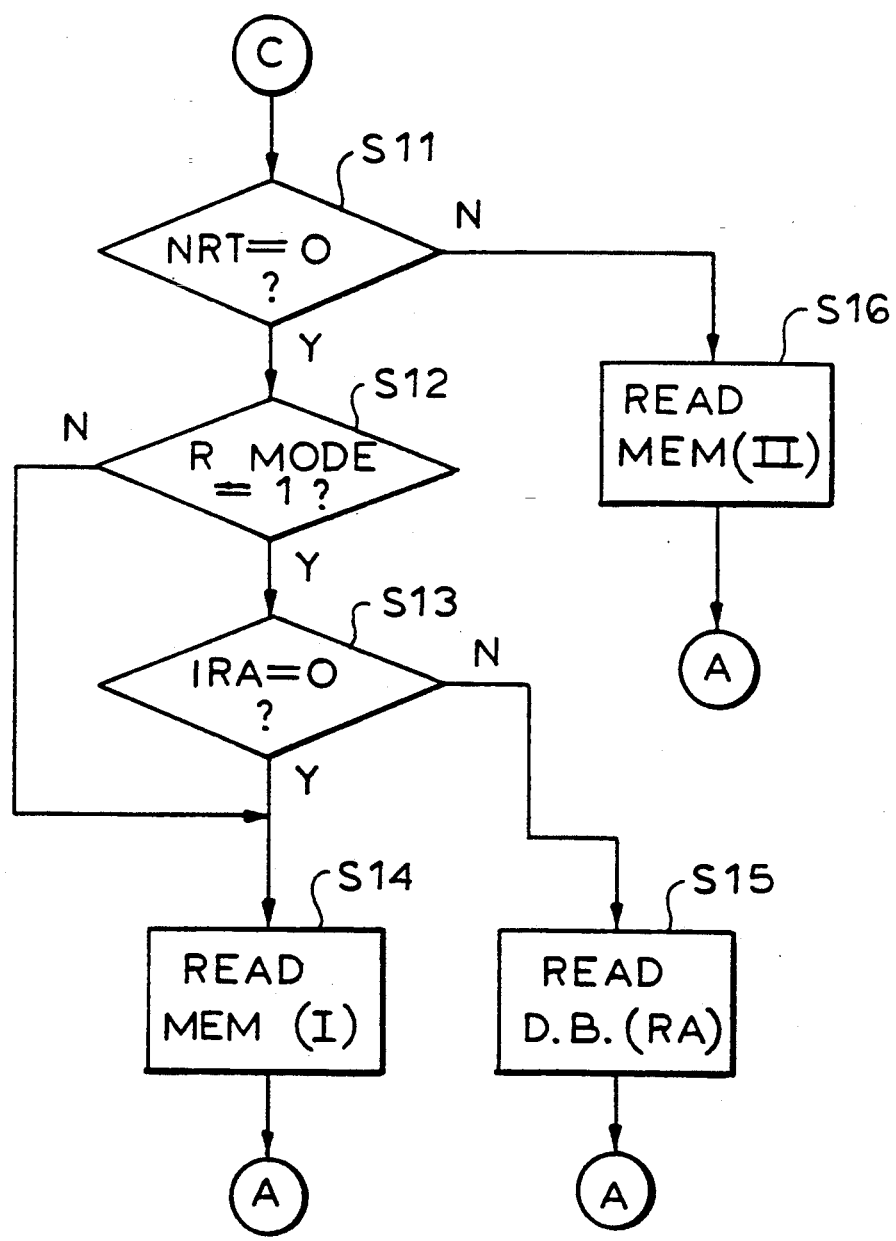

If the slot of interest is a demand assignment slot as determined in the step S4, the operation is transferred to a step S11, FIG. 13B. In the step S11, whether or not the number of packets stored in the memory (II) 1103 and fed from the data buffer (RS) 613, i.e., the number of re-transmission packets (NRT) is zero. If the answer of the step S11 is NO, the control circuit feeds a read enable signal to the memory (II) 1103 and causes the switch 1301 to select a data packet which will be read out of the memory (II) 1103 (step S16), and then the program awaits. If the answer of the step S11 is YES, whether or not the current mode is the random access re-transmission mode (RMODE=1) (step S12) is determined. If the answer of the step S12 is YES, a step S13 is executed; if otherwise, a step S14 is executed. In the step S14, a data packet is read out of the memory (I) 1101 adapted for demand access, i.e., the control circuit delivers a read enable signal to the memory (I) 1101 and causes the switch 1301 to select a data packet which will be read out of the memory (I) 1101.

If the random access mode has been set up (RMODE=1) as determined in the step S12, whether or not any data packet for random access slots is left in the data buffer (RA) 614 (IRA=0) is determined (step S13). If the answer of the step S13 is NO, a step S15 is executed for causing the switch 1301 to select data which is read out of the data buffer (RA) 614. In the step S15, a re-transmission data packet is sent in a reserved time slot.

If the answer of the step S13 is YES (IRA=0), the switch 1301 selects a data packet which is read out of the memory (I) 1101.

Figure 14:
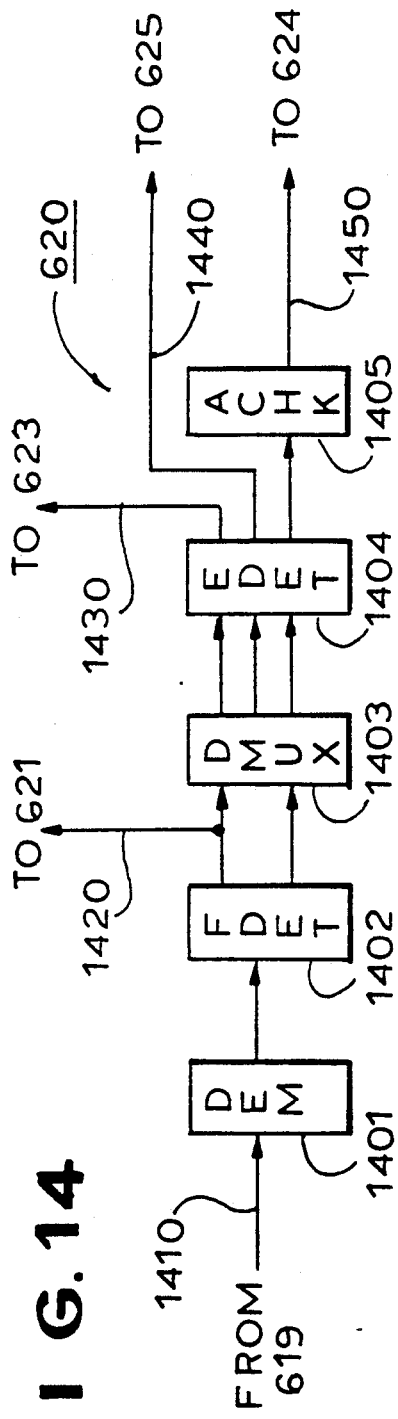
FIG. 14 is a block diagram schematically showing a receiver installed in the mini-earth station.

Referring to FIG. 14, a specific construction of the receiver 620 included in the mini-earth station is shown. The receiver 620 has a demodulator 1401 for demodulating an IF signal which is fed from the RF section 619, FIG. 6 to produce a baseband signal. A frame timing signal detector (FDET) 1402 produces a frame timing signal (FR), FIG. 4, from the demodulated signal and delivers it to the frame synchronizing circuit 621, FIG. 6 over a signal line 1420. The data sequence from which the frame timing signal has been excluded and the frame timing signal are fed to a demultiplexer (DMUX) 1403. In response, the demultiplexer 1403 separates, on the basis of the frame timing signal, the input data sequence into a reception response signal (RRP), a random access slot assignment field (RA) a reserved slot assignment field (RSA), and packet data, and delivers them to an error detector (EDET) 1404.

The error detector 1404 checks the input data for errors by using the frame check sequence and discards data with errors. In this instance, it is preferable to return a NAK signal to the hub station C for requesting re-transmission, although not described specifically. When no errors have been detected, the reception response signal (RRP) is applied to the re-transmission controller 625, FIG. 6, over a signal line 1440.

The random access slot assignment field (RA) and reserved slot assignment field (RSA) are fed to the slot supervisor 623, FIG. 6, over a signal line 1430. The packet data is applied to an address checking section (ACHK) 1405. The address checking section 1405 determines, by checking the address filed (ADR) of the data packet which is formatted as shown in FIG. 3, whether or not the data packet of interest is destined to the own station. The address checking section 1405 discards data packets destined to the other stations and feeds only the data packets meant for the own station to the data buffer 624, FIG. 6, over a signal line 1450.

Figure 15A:
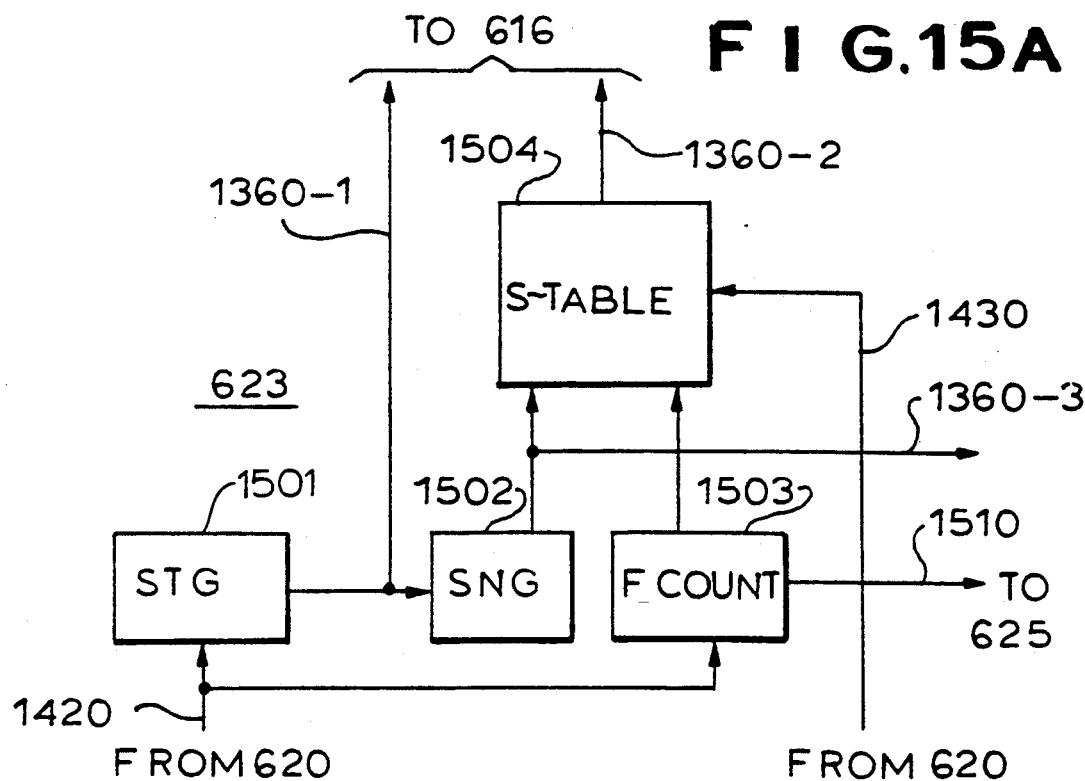
FIG. 15A is a block diagram schematically showing a specific construction of a slot supervisor installed in the mini-earth station.

FIG. 15A shows a specific construction of the slot supervisor 623, FIG. 6. As shown, a slot timing generator (STG) 1501 generates a slot timing signal in response to a frame timing signal 1420 fed from the synchronizing section 621, FIG. 6, and delivers it to a slot number generator (SNG) 1502. The slot timing signal is also fed to the data selection unit 616, FIG. 6, via a signal line 1360-1. In response to the slot timing signal, the slot number generator 1502 generates a slot number. A frame number counter (FCOUNT) 1503 outputs a frame number by counting the frame timing signals. A slot assignment table (S-TABLE) 1504 is fed from the receiver 620 to the slot supervisor 623 over a signal line 1430. The slot assignment table 1504 stores random access slot store information (RA) and own station's reserved slot assignment information. The own station's reserved slot assignment information is stored in the table 1504 beforehand. The table 1504 feeds time slot assignment information 1360-2 to the data selection unit 616 according to the slot number.

Figure 15B:
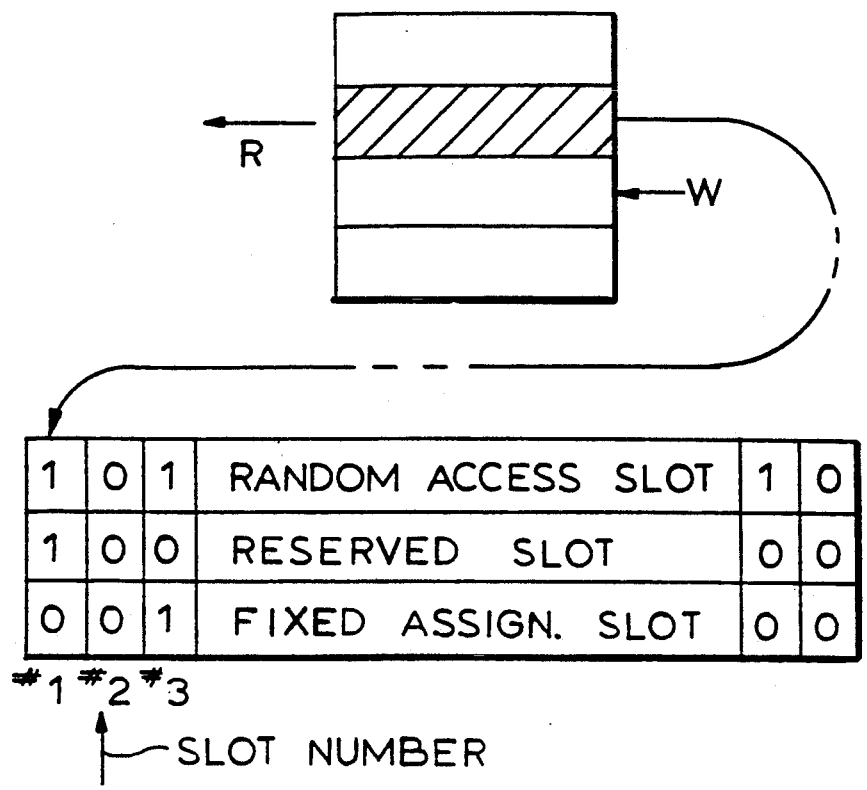
FIG. 15B shows the format of a slot assignment table loaded in the slot supervisor.

FIG. 15B shows the format of the slot assignment table 1504. As shown, the table 1504 has a plurality of frames each being made up of three layers. The three layers of each frame store respectively the random access slot information, demand slot information, and fixed slot information. The information is written to and read out of the table 1504 according to the frame number and slot number.

Concerning the random access slot information, slot with the value "0" are the slots with which random access is allowed while the others are reserved or fixed in assignment. In the demand slot information, slots with the value "1" are the reserved slots assigned to the own station. Further, in the fixed slot information, slots with the value "1" are the fixed slots assigned to the own station. For example, the slot #1 shown in FIG. 15 is the own station's reserved slot.

Figure 16:
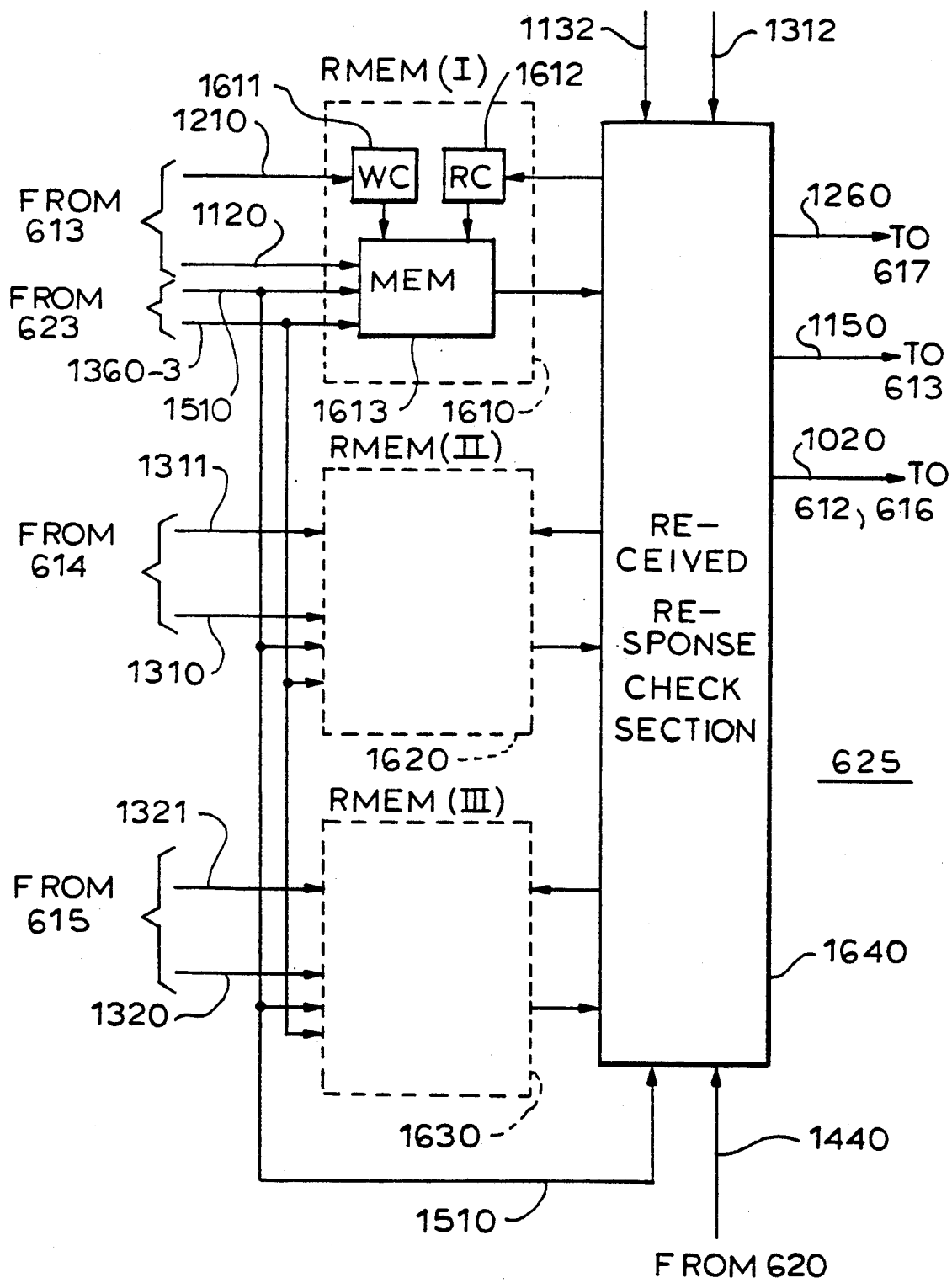
FIG. 16 is a block diagram schematically showing a specific construction of a re-transmission controller included in the mini-earth station.

FIG. 16 shows a specific construction of the re-transmission controller 625 which stores transmitted data for re-transmission. When the data selection unit 616 delivers a read enable signal 1210, 1311 or 1321 to the data buffer (RS) 613, data buffer (RA) 614 or data buffer (F) 615, the data for re-transmission is fed from the particular buffer. The data from the data buffer (RS) 613 is written to a re-transmission memory (RMEM) (I) 1610 via a signal line 1120. The data from the data buffer (RA) 614 is written to a re-transmission memory (RMEM) (II) 1620 via a signal line 1310. The data from the data buffer (F) 615 is written to a re-transmission memory (RMEM) (III) 1630 via a signal line 1320. In the re-transmission memory (I) 1610, for example, a write control circuit 1611 generates a write address by regarding the read command signal from the data selection unit 616 as a write enable signal. The time slot supervisor 623 delivers a frame number 1510 and a slot number 1360-3 to each of the re-transmission memories (I) 1610, (II) 1620 and (III) 1630 and stored in the slot-number together with the associated data. For example, the re-transmission data from the data buffer (F) 615 is written to the re-transmission memory (III) 1630 together with a frame number and a slot number. A reception response checking section 1640 is implemented by a microprocessor, for example, and executes the following processing in response to a reception response signal 1440, a frame number 1510, a slot number 1360-3, the number of packets stored in the memory (II) 1103 (NRT) delivered from the data buffer (RS) 613 and the number of packets stored in the data buffer (RA) 614 (NRA). In the following description, let the interval between the transmission of data from the mini-earth station and the reception of a reception response signal be a three-frame period. Specifically, assuming that the current frame number is n, a reception response signal associated with a packet which has been transmitted in the (n−3) frame is received.

Figure 17A:
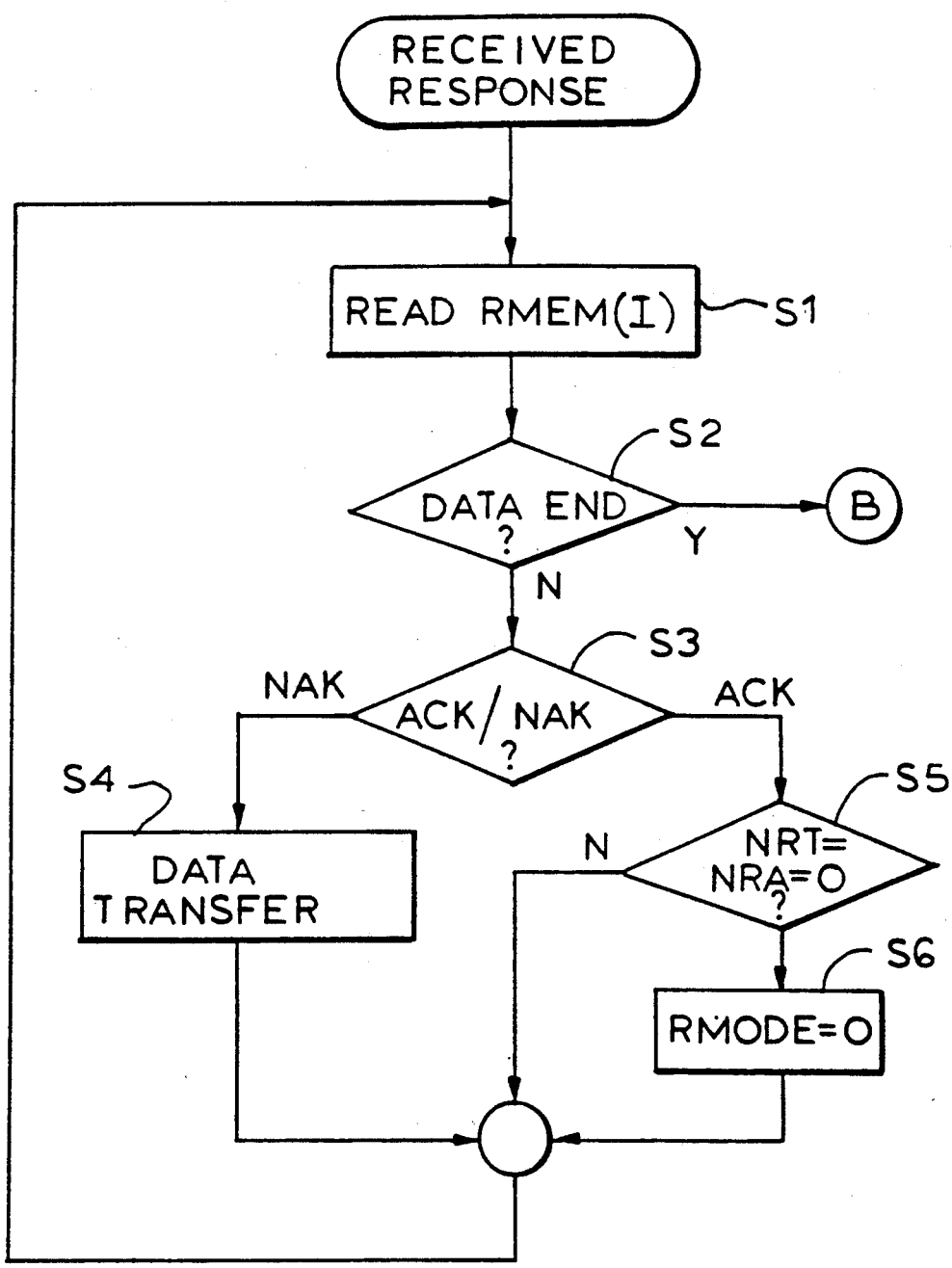
FIGS. 17A to 17C are flowcharts representative of specific operations of a reception response checking section forming a part of the re-transmission controller.
Figure 17B:
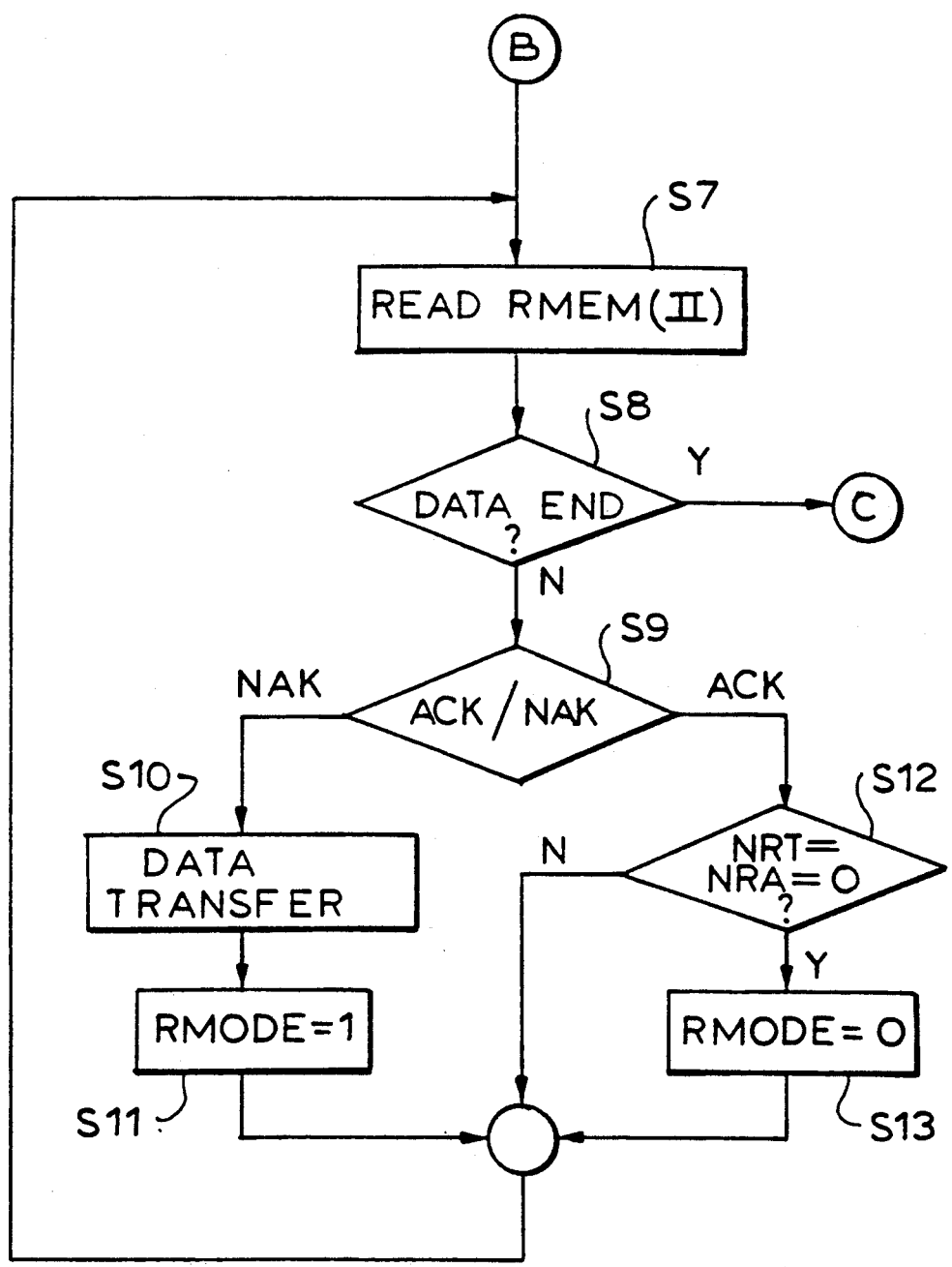
Figure 17C:
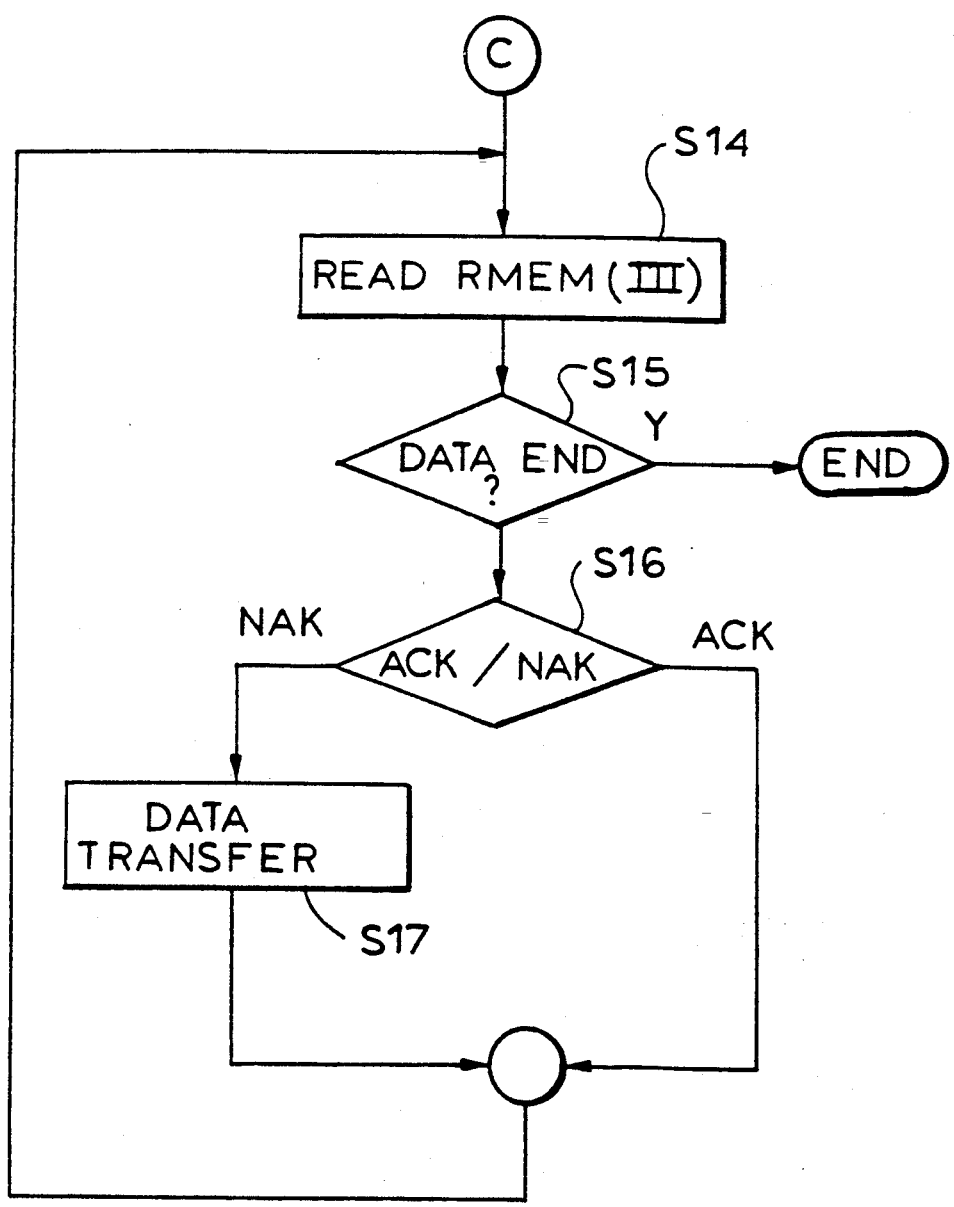

FIGS. 17A, 17B and 17C indicate the processing executing by the reception response checking section 1640. The microprocessor constituting the section 1640 is triggered on the reception of the reception response signal 1440. The signal 1440 is stored in the microprocessor.

First, the reception response checking section 1640 reads data transmitted in the (n−3) frame out of the re-transmission memory (I) 1610 (step S1). A memory 1613 included in the re-transmission memory (I) 1610 is loaded with a frame number and a slot number beforehand together with a data packet, as stated earlier. Hence, the checking section 1640 is capable of locating a reception response signal associated with the data by reading the data.

In a step S2, the checking section 1640 references the frame number associated with the data read out to see if the data is the data which was transmitted in the frame (n−3). If the data is not the data transmitted in the frame of interest, meaning the in the re-transmission memory (I) 1610 (n−3) frame data is absent, the checking section 1640 instructs a read control circuit 1612, FIG. 16, to restore the read start address to the one occurred before the data read-out, thereby completing the processing with the re-transmission memory (I) 1610. In a step 3, the checking section 1640 examines a reception response signal associated with the slot of the data read out. The reception response signal will be the ACK signal if the own station's address is written in the position of the received response signal which is associated with the data, and it will be the NAK signal if otherwise. The program advances to a step S4 if the signal is the NAK signal or to a step S5 if it is the ACK signal.

In the step S4, the checking section 1640 transfers the read data to the data buffer (RS) 613, FIG. 6, over the signal line 1150. In the step S4, the checking section 1640 delivers a time slot reservation request 1360 to the reservation request adding section 617, FIG. 6, requesting the reservation of one slot. Then, the program returns to the step S1.

In a step S5, the checking section 1640 determines whether or not the data packet is left in the memory (II) 1103 and the data buffer (RA) 614 (NRT=NRA=0). If NRT=0 and NRA=0 in the step S5, the checking section 1640 executes a step S6 for resetting the random access re-transmission mode, i.e. RMODE=0. If NRT=0 or NRA=0 in the step S5, the checking section 1640 executes no operation with the result that the data received the ACK signal is discarded. On completing these steps, the program returns to the step S1.

FIG. 17B shows processing which the checking section 1640 executes with the re-transmission memory (II) 1620. In the figure, steps S7 to S9 are identical in content with the steps S1 to S3 associated with the re-transmission memory (I) 1610. The processing shown in FIG. 17B differs from the processing shown in FIG. 17A in that when the response associated with the read data is NAK, the checking section 1640 transfers the data to the data buffer (RS) 613 for requesting the reservation of one time slot (step S10) and, in addition, sets the random access re-transmission mode (RMODE=1) and delivers a signal representative of the random access mode to the signal line 1020 (step S11). Steps S12 and S12 in FIG. 17B are the same as the steps S5 and S6 of FIG. 17A.

FIG. 17C shows the operation of the checking section 1640 associated with the re-transmission memory (III) 1630. In the figure, steps S14 to S16 are identical in content with the steps S1 to S3 or S7 to S9 stated above. Characteristically, in FIG. 17C, only the re-transmission processing is executed for data which resulted in the NAK response. The random access re-transmission mode is not set up.

Figure 18:
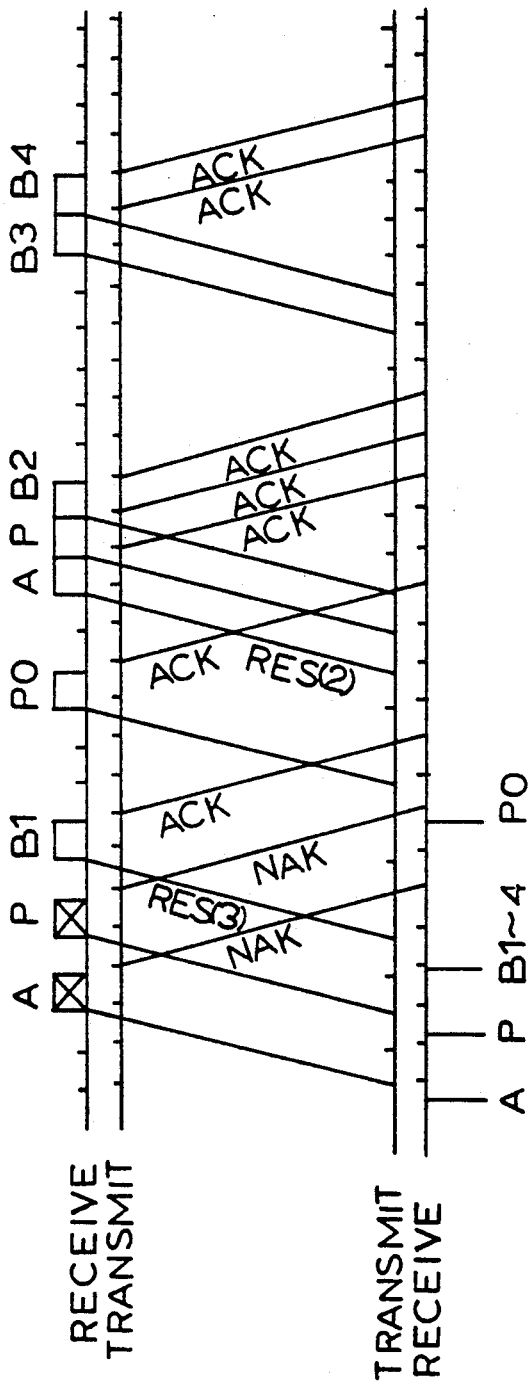
FIG. 18 shows a specific operation of the multiple access satellite communication system in accordance with the present invention.

Referring to FIG. 18, the operation of a satellite communication network to which the present invention is applied will be described. Assume that the data buffer (RA) 614 is loaded with single short data A, and that re-transmission data does not exist. Then, the short data A is read out by the data selection unit 616 and then transmitted in a particular random access slot designated by the slot supervisor 623. Subsequently, when single data P adapted for fixed assignment access is fed from a user terminal and written to the data buffer (F) 615, it is read out by the data selection unit 616 and transmitted in the first fixed assignment slot designated by the slot supervisor 623.

Assume that the reception response of the hub station C was NAK for both of the short data A and the fixed assignment data P. On the other hand, before the reception of the NAK response in reply to the short data A, the mini-earth-station of interest has received long data corresponding to four slots from the user terminal, has divided the long data into four packets B1, B2, B3 and B4, has transmitted the first packet B1 while adding a reservation request for the remaining three packets thereto, and has stored the remaining three packets B2, B3 and B4 in the data buffer (RS) 613. On receiving the NAK in reply to the short data A, the re-transmission controller 625 transfers the short data A and fixed assignment data P again to the data buffer (RS) 613 and delivers a random access re-transmission mode signal to the message length detector 612 and data selection unit 616 to show the latter that re-transmission data has appeared. Assuming that fixed assignment data $P_0$ is received from the user terminal later, it is transmitted in the first fixed assignment slot designated by the slot supervisor 623. This is successful in preventing the re-transmission data P from occupying the fixed assignment slot.

In the above condition, the data buffer (RS) 613 is loaded with five packets in total, i.e., re-transmission data A' associated with the short data A, re-transmission data P' associated with the fixed assignment data P, and the remaining three packets B2, B3 and B4 of the long data. When the assignment of reserved three packets is received, three packets, i.e., the re-transmission data A' and P' and the first packet B2 of the remaining packets are transmitted. Although the packets B3 and B4 are again left in the data buffer (RS) 613 due to the short assignment, a reservation request for the packets B3 and B4 is transmitted together with the re-transmission data A'. Hence, the packets B3 and B4 will be transmitted when assignment associated therewith is received.

In the illustrative embodiment, all the re-transmission data are transmitted by the demand assignment access method. Alternatively, the data buffer (F) 615, like the buffer (RS) 613, may be provided with a buffer for storing re-transmission data which is transferred from the re-transmission controller 625. Then, when the NAK response is received in reply to data transmitted by the fixed assignment access method, the data will be transferred to the re-transmission data buffer of the data buffer (F). Therefore, data transmitted in a fixed assignment slot will be re-transmitted in a fixed assignment slot. Such an alternative arrangement is advantageously applicable to a system which includes a great number of terminals of the type generating data for fixed assignment access and most of the slots are fixed assignment slots, i.e., the combined random and demand access method would increase the delay.

What is claimed is:

1. A multiple access satellite communication system for data transmission by a method which is a combination of a fixed assignment access method and a combined random and demand access method, comprising:
   a single hub earth station;
   a plurality of mini-earth stations connected to said hub earth station by satellite channels;
   said plurality of mini-earth stations each transmitting a data packet to said hub earth station over an inbound channel by time division multiple access;
   said hub earth station transmitting identical data to said mini-earth stations over outbound channels;
   said plurality of mini-earth stations each accommodating a terminal which generates data to be transmitted in a slot of the inbound channel by a fixed assignment access method, and a terminal generating data to be transmitted in a slot of the inbound channel by a combined demand assignment access and random access method;
   said hub earth station comprising:
   receiving means for producing packet data by demodulating a signal on the inbound channel, generating an error detection signal packet data by packet data by detecting errors in the packet data, and extracting from the packet data free from errors received data and reservation slot request information which any of said plurality of mini-earth stations may transmit;
   means for generating a frame timing signal for the outbound channel;
   control means for producing reservation assignment information in response to said reservation slot request information and producing a reception response in response to said error detection signal;
   means for multiplexing said reservation assignment information and said reception response with data fed from a host terminal which is connected to said hub earth station; and
   means for transmitting said multiplexed data over the outbound channels after modulating said multiplexed data;
   said plurality of mini-earth stations each comprising:
   receiving means for demodulating a signal on the outbound channel to separate said frame timing signal for the outbound channel, said reservation assignment information, said reception response signal, and the data from the host terminal;
   means for generating an in-station frame timing signal exclusive for said mini-earth station in response to said frame timing signal;
   slot supervising means for outputting slot assignment information on the basis of said in-station frame timing signal and said reservation assignment information;
   a first buffer for temporarily storing data to be transmitted by the demand assignment access method;
   a second buffer for temporarily storing data to be transmitted by the random access method;
   a third buffer for temporarily storing data to be transmitted by the fixed assignment access method;
   access method detecting means for transferring, when data inputted from any of said terminals connected to said mini-earth station is data to be transmitted by the fixed assignment access method, said data to said third buffer and transferring other data to a message length detecting section;
   said message length detecting section being for detecting, when a re-transmission mode signal is OFF, a data length of the input data, transferring to said second buffer short data which can be transmitted in one time slot, dividing long data which cannot be transmitted in one slot into a plurality of data portions, transferring a first one of said plurality of data portions to said second buffer, transferring the other data portions to said first buffer, and outputting a first request signal representative of a request for reservation of a necessary number of slots, and transferring, when said re-transmission mode signal is ON, all of said input data to said first buffer and outputting said first request signal with no regard to the data length;
   data selecting means for reading, when said re-transmission mode signal is OFF, data out of said first buffer when said slot assignment information is indicative of a demand assignment access slot, data out of said second buffer when said slot assignment information is indicative of a random access slot, and data out of said third buffer when said slot assignment information is indicative of a fixed assignment access slot, and, when said re-transmission mode signal is ON, reading data out of said first and second buffers when said slot assignment information is indicative of a demand assignment access slot and data out of said third buffer when said slot assignment information is indicative of a fixed assignment access slot;

re-transmission control means for storing the data read by said data selecting means, discarding, when said reception response is positive (ACK), the data associated with said ACK response and transferring, when said reception response is negative (NAK), the data associated with said NAK response to said first buffer while outputting a second request signal representative of a request for reservation of a necessary number of slots, turning said re-transmission mode signal ON when a reception response in reply to a packet transmitted in the random access slot is negative, and turning said re-transmission signal OFF when a reception response to re-transmitted data is positive;

reservation request adding means for producing said reservation slot request information in response to said first and second reservation requests and adding said reservation slot request information to an output of said data selecting means; and means for sending an output of said reservation request adding means to the inbound channel.

2. A system as claimed in claim 1, wherein said re-transmission control means transfers re-transmission data to said third buffer when a reception response to a packet transmitted in the fixed assignment access slot is negative.

3. A multiple access satellite communication system for data transmission by a method which is a combination of a fixed assignment access method and a combined random and demand access method, comprising:

a single hub earth station;

a plurality of mini-earth stations connected to said hub earth station by satellite channels;

said plurality of mini-earth stations each transmitting a data packet to said hub earth station over an inbound channel by time division multiple access;

said hub earth station transmitting data to said mini-earth stations over outbound channels;

said plurality of mini-earth stations each accommodating a terminal which generates data to be transmitted in a slot of the inbound channel by a fixed assignment access method, and a terminal which generates data to be transmitted in a slot of the inbound channel by a combined demand assignment access and random access method;

said hub earth station comprising:

receiving means for receiving packet data on the inbound channel, generating an error detection signal packet data by packet data by detecting errors in the packet data, and extracting from the packet data free from errors received data and reservation slot request information which any of said plurality of mini-earth stations may transmit;

control means for producing reservation assignment information in response to said reservation slot request information and producing a reception response in response to said error detection signal; and means for transmitting over the outbound channels said reservation assignment information and said reception response, and data fed from a host terminal which is connected to said hub earth station;

said plurality of mini-earth stations each comprising:

receiving means for receiving said reservation assignment information, said reception response, and the data from the host terminal;

slot supervising means for outputting slot assignment information on the basis of said reservation assignment information;

transmitting means for transmitting data by using a slot assigned to said fixed assignment access method to said hub station when the data is to be transmitted by said fixed assignment access method, for transmitting data by using a slot assigned to said random access method to said hub station when the data is to be transmitted by said random access method, and for transmitting data by using a slot assigned to said demand assignment access method and said reservation slot request when the data is to be transmitted by said demand assignment access method; and re-transmission control means for storing the data which is transmitted to the hub station by said transmitting means, discarding, when said reception response is positive (ACK), the data associated with said ACK response and transferring, when said reception response is negative (NAK), the data associated with said NAK response to said transmitting means as said data to be transmitted by said demand assignment access method.

* * * * *